US011661981B2

(12) United States Patent
Ozawa et al.

(10) Patent No.: US 11,661,981 B2
(45) Date of Patent: *May 30, 2023

(54) POWER TRANSMISSION DEVICE

(71) Applicant: Kabushiki Kaisha F.C.C., Hamamatsu (JP)

(72) Inventors: Yoshihiko Ozawa, Hamamatsu (JP); Han Hiong Chen, Hamamatsu (JP); Katsu Yoshimoto, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,341

(22) Filed: Jul. 8, 2022

(65) Prior Publication Data
US 2022/0341474 A1    Oct. 27, 2022

Related U.S. Application Data

(63) Continuation of application No. 17/336,479, filed on Jun. 2, 2021, now Pat. No. 11,434,966, which is a (Continued)

(30) Foreign Application Priority Data

Dec. 5, 2018 (JP) .............................. JP2018-227996

(51) Int. Cl.
*F16D 43/12* (2006.01)
*F16D 13/52* (2006.01)
(Continued)

(52) U.S. Cl.
CPC .............. *F16D 43/12* (2013.01); *B60K 17/02* (2013.01); *F16D 13/52* (2013.01); *F16D 43/206* (2013.01); *F16D 67/02* (2013.01)

(58) Field of Classification Search
CPC ............................... F16D 43/12; F16D 43/206
See application file for complete search history.

(56) References Cited

U.S. PATENT DOCUMENTS

2015/0337910 A1    11/2015  Yoshimoto et al.
2021/0285510 A1     9/2021  Ozawa et al.

FOREIGN PATENT DOCUMENTS

JP       42-12425       7/1967
JP       S62-143827 U   9/1987
(Continued)

OTHER PUBLICATIONS

International Search Report dated Feb. 25, 2020 in corresponding PCT Application No. PCT/JP2019/047409.

*Primary Examiner* — Timothy Hannon
(74) *Attorney, Agent, or Firm* — Harness, Dickey & Pierce, P.L.C.

(57) ABSTRACT

A power transmission device has a first pressure member (5a), a second pressure member (5b) and a back-torque transmitting cam. The first pressure member (5a) presses the drive-side clutch plates (6) and the driven-side clutch plates (7) against each other. The second pressure member (5b) releases a press-contact force between the drive-side clutch plates (6) and the driven-side clutch plates (7). The back-torque transmitting cam moves the second pressure member (5b) relative to the first pressure member (5a) to keep pressing the drive-side clutch plates (6) and the driven-side clutch plates (7) against each other when a rotational force is input to the clutch member (4), via the output shaft (3), in a process where the weight member (8) moves from the radially-outer position to the radially-inner position and the first pressure member (5a) moves to follow the interlocking member (9).

11 Claims, 21 Drawing Sheets

Related U.S. Application Data continuation of application No. PCT/JP2019/047409, filed on Dec. 4, 2019.

(51) Int. Cl.
*F16D 43/206* (2006.01)
*B60K 17/02* (2006.01)
*F16D 67/02* (2006.01)

(56) References Cited

FOREIGN PATENT DOCUMENTS

| | | |
|---|---|---|
| JP | 2012-57728 A | 3/2012 |
| JP | 2017-155884 A | 9/2017 |
| WO | WO-2016/088860 A1 | 6/2016 |
| WO | WO-2019/044950 A1 | 3/2019 |
| WO | WO-2019/044951 A1 | 3/2019 |

[Fig. 1]
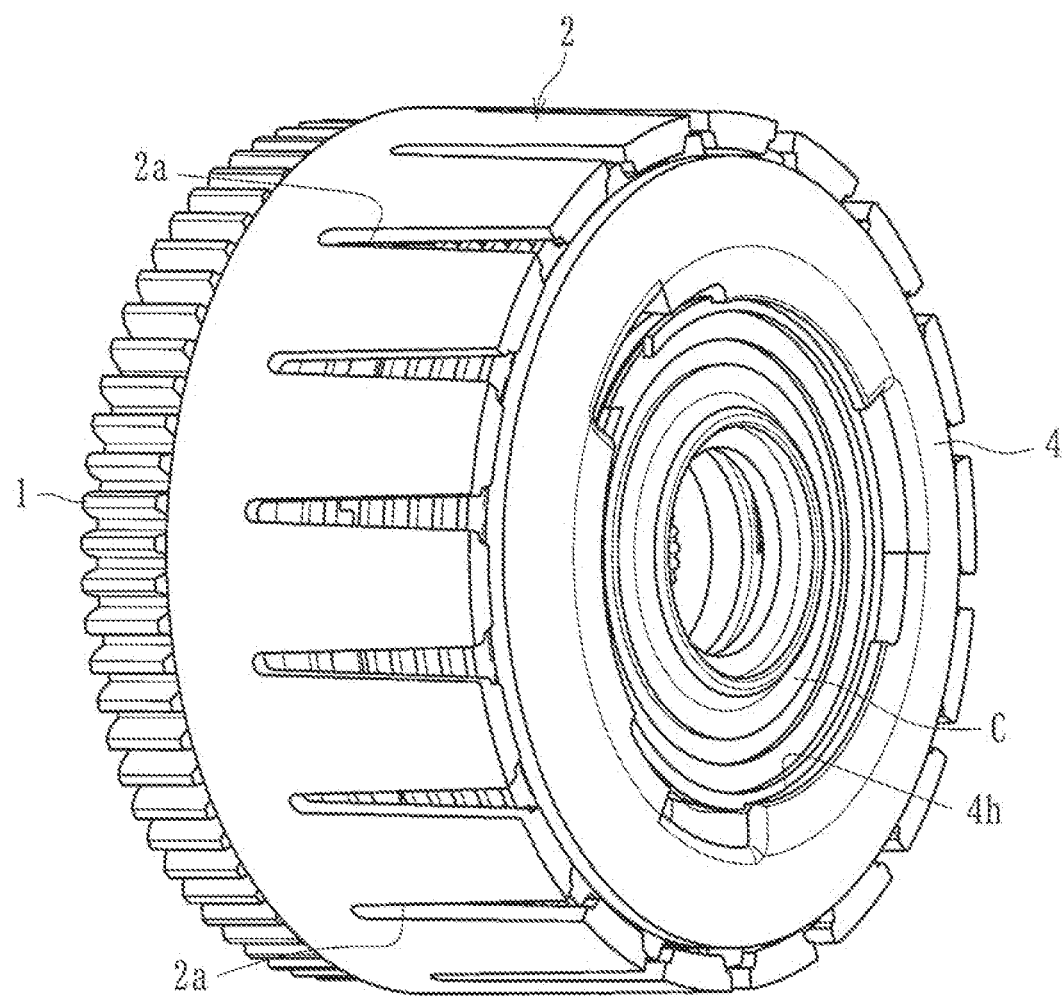

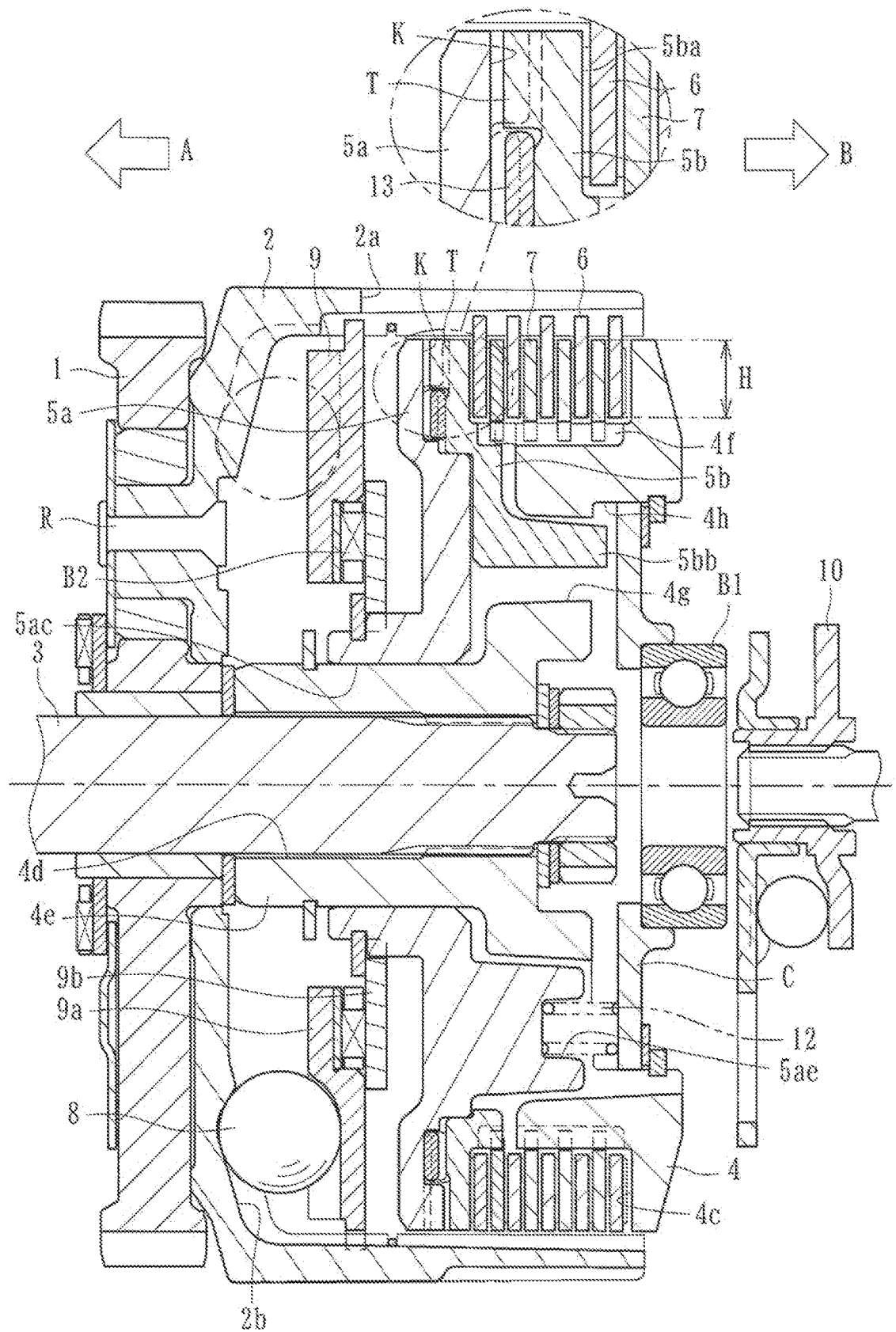
[Fig. 2]

[Fig. 3]
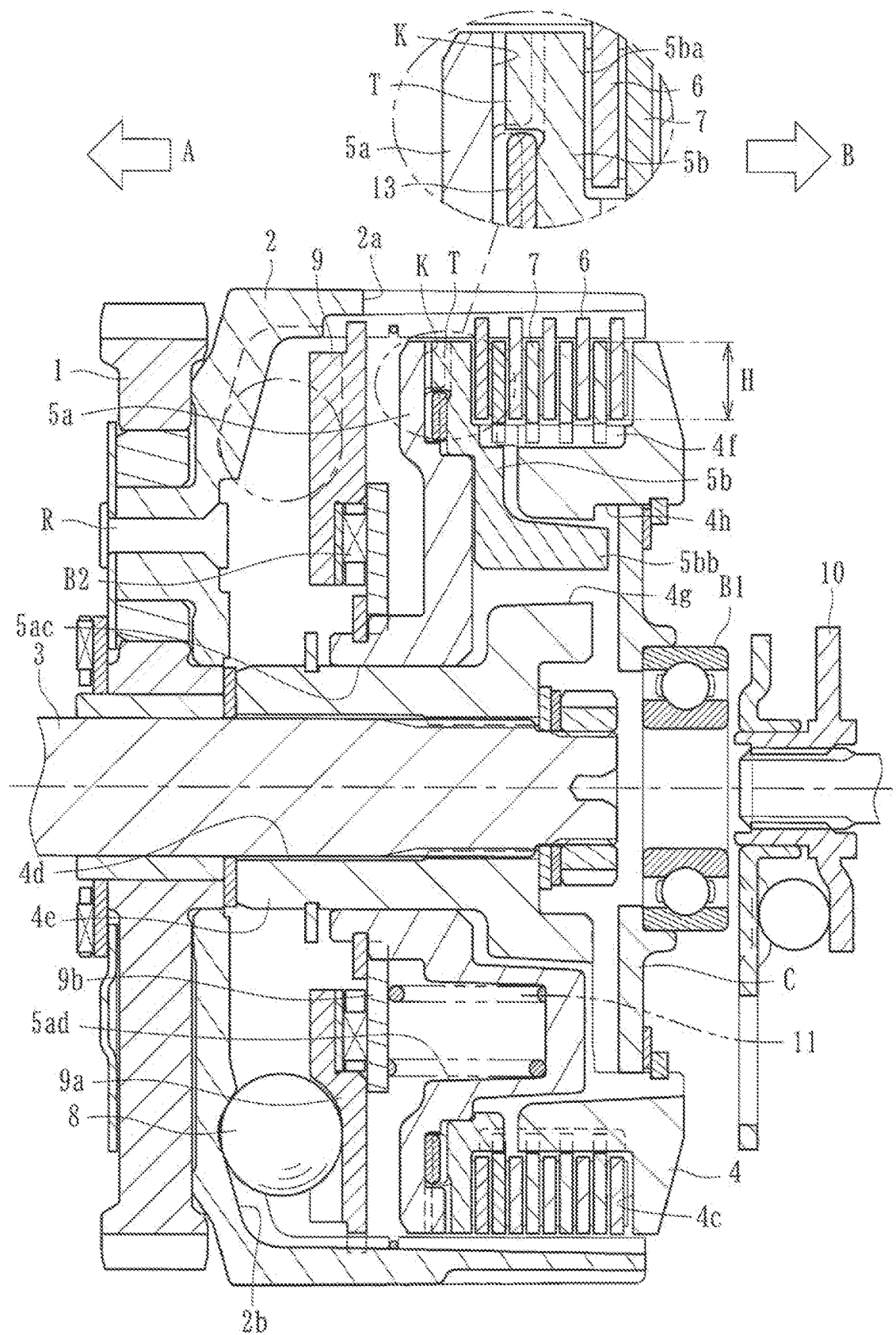

[Fig. 4]
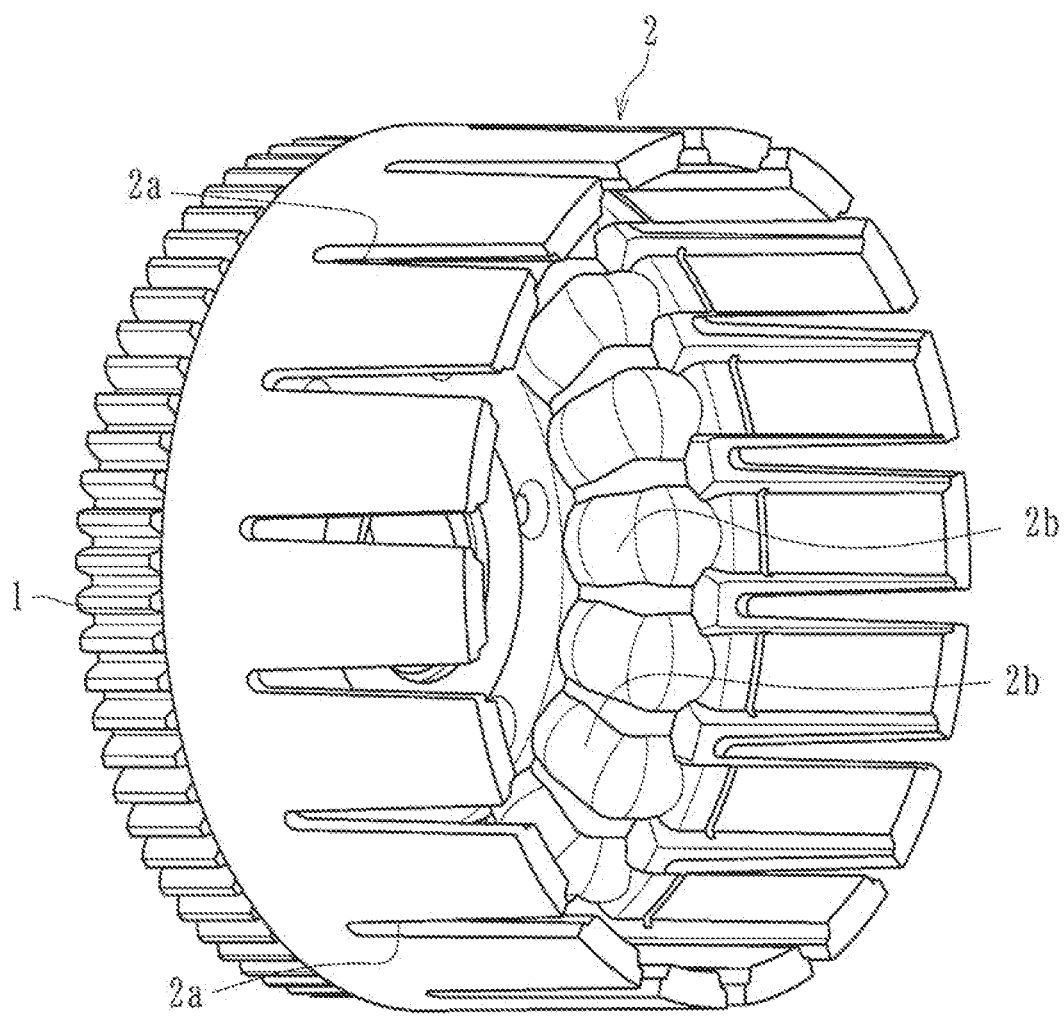

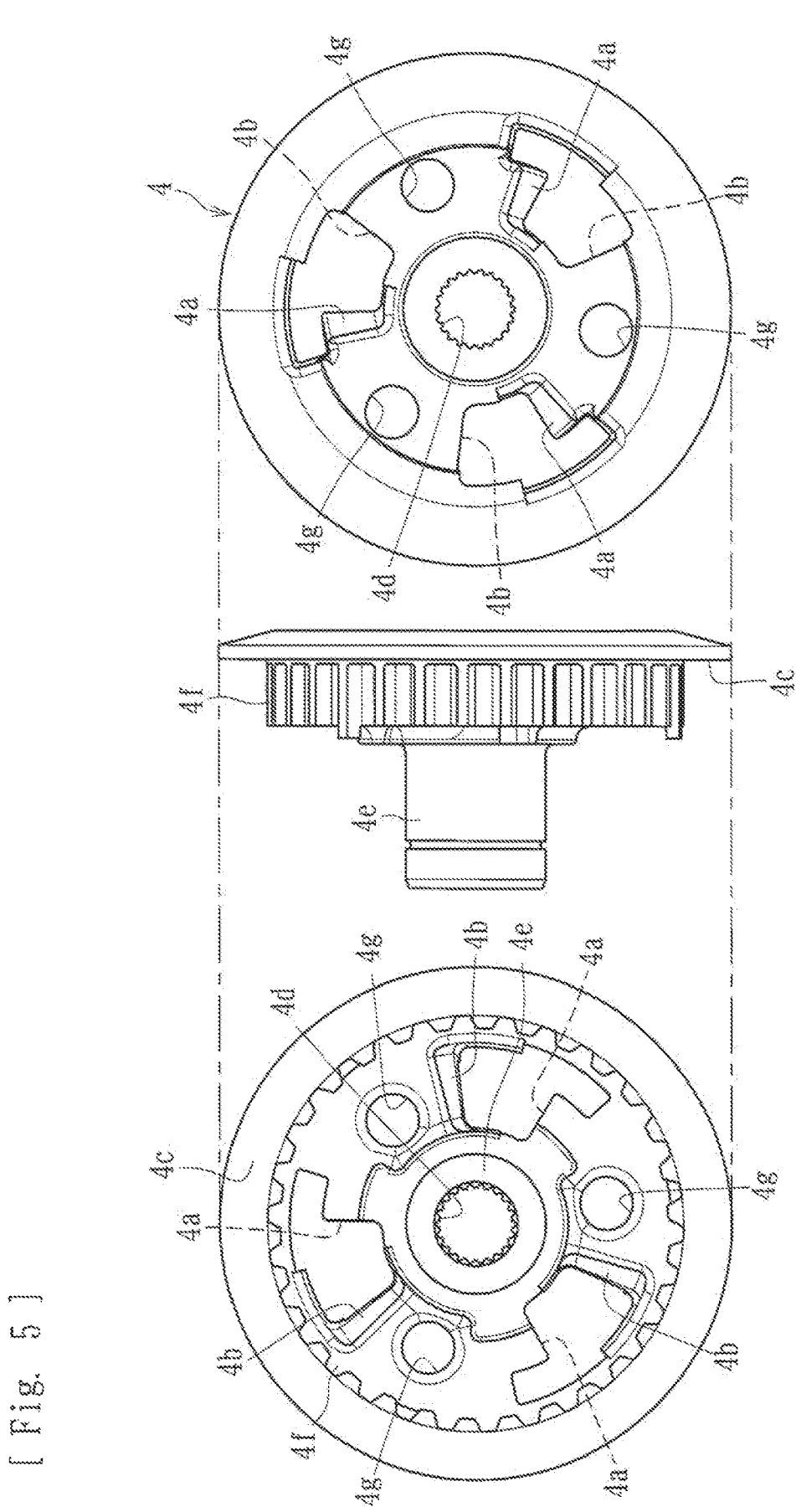
[Fig. 5]

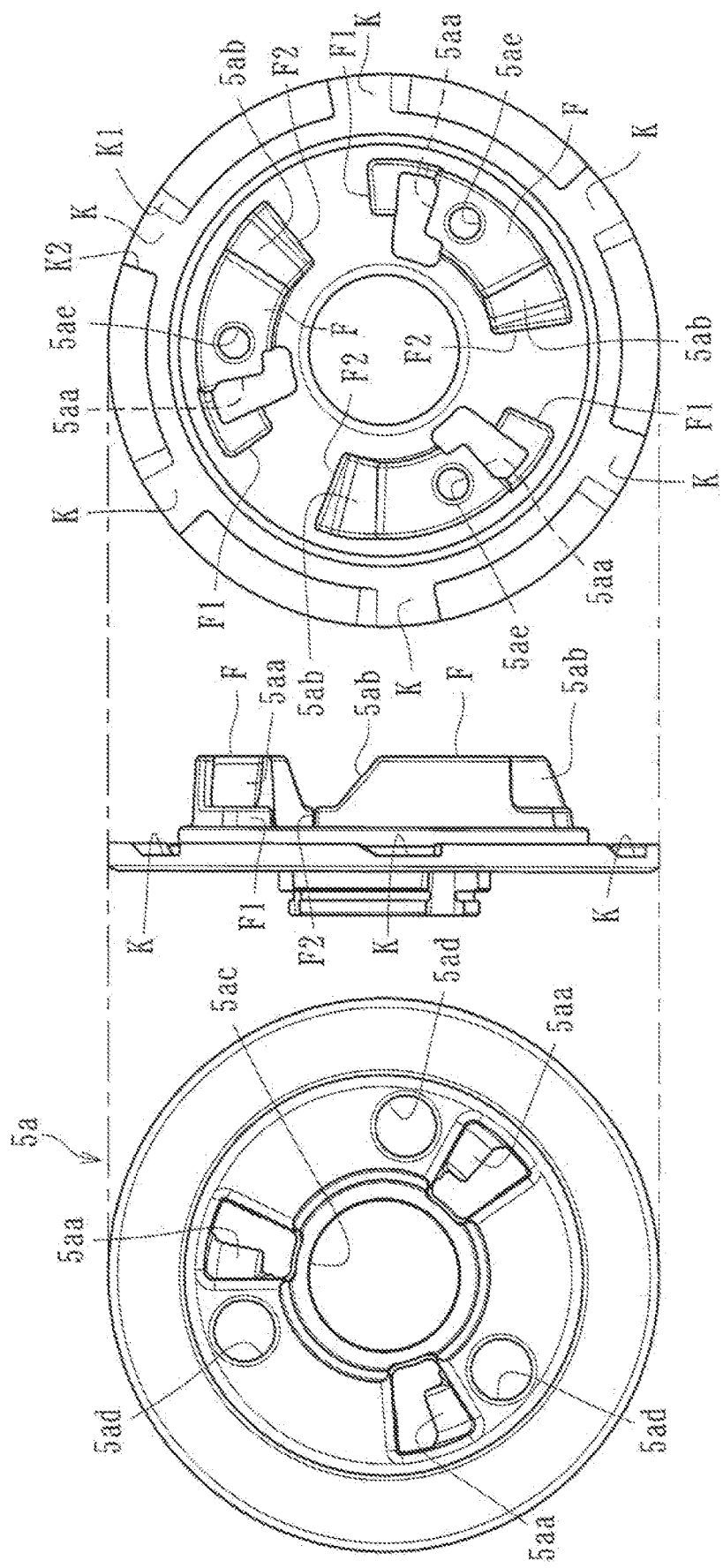

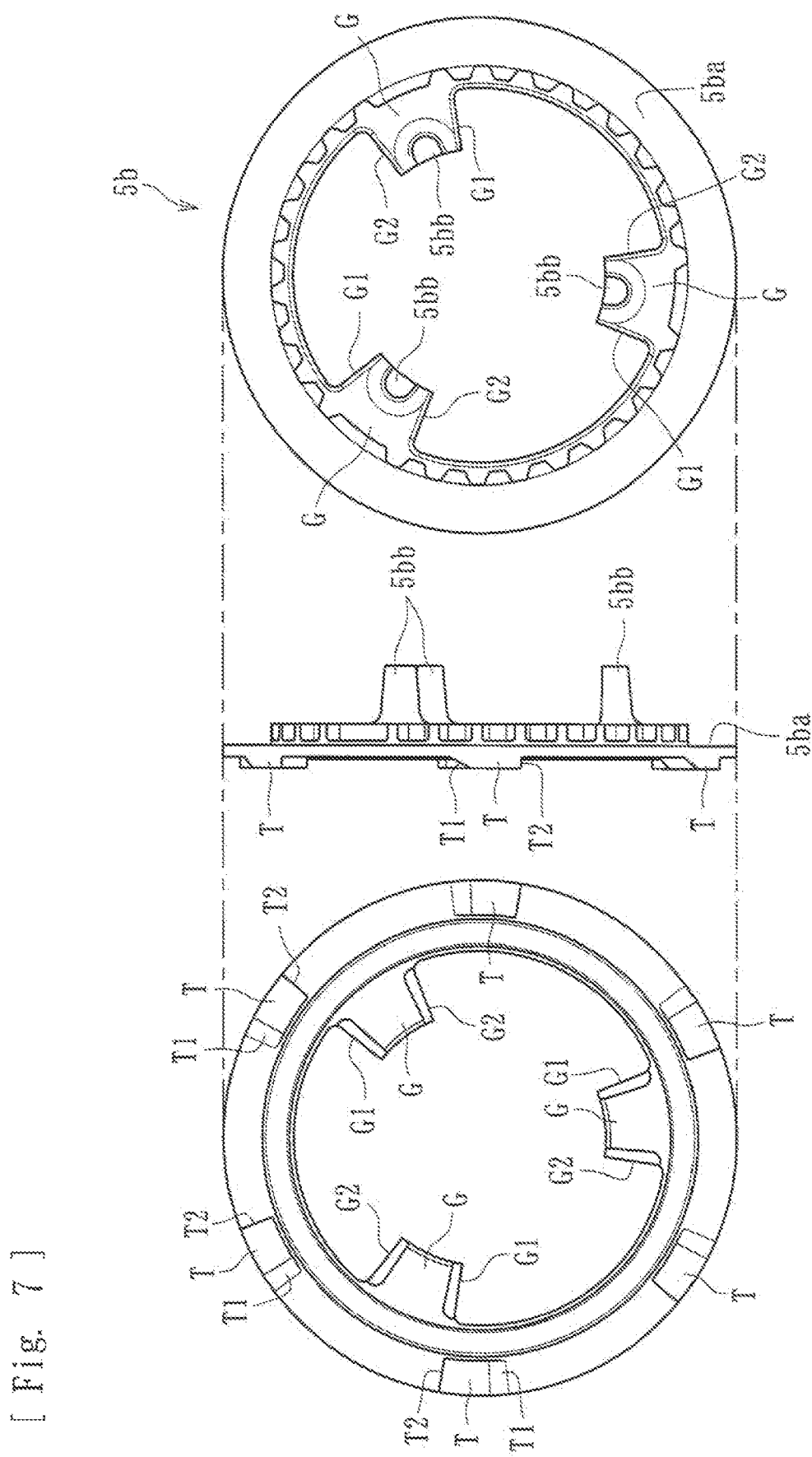
[Fig. 7]

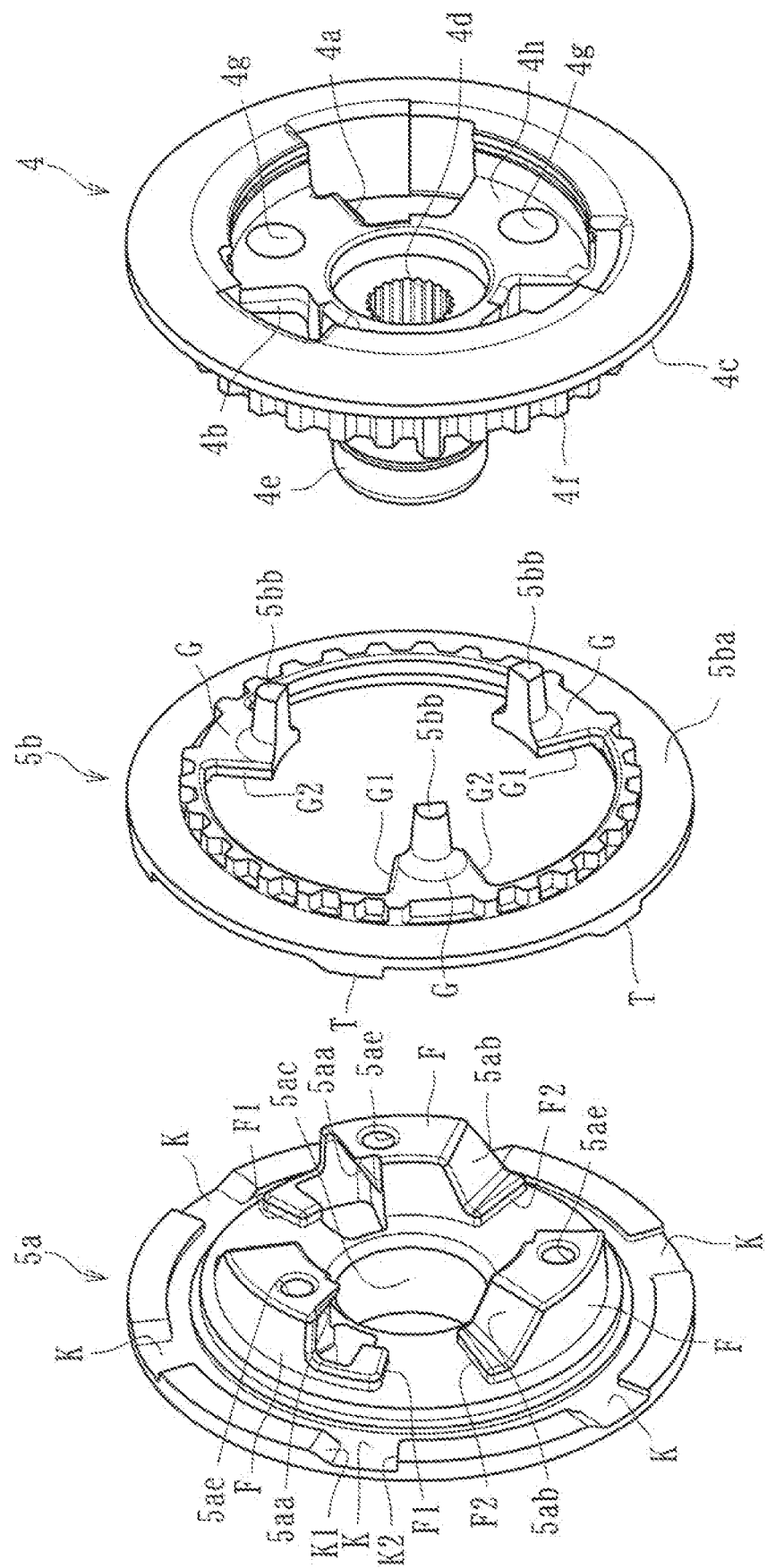
[Fig. 8]

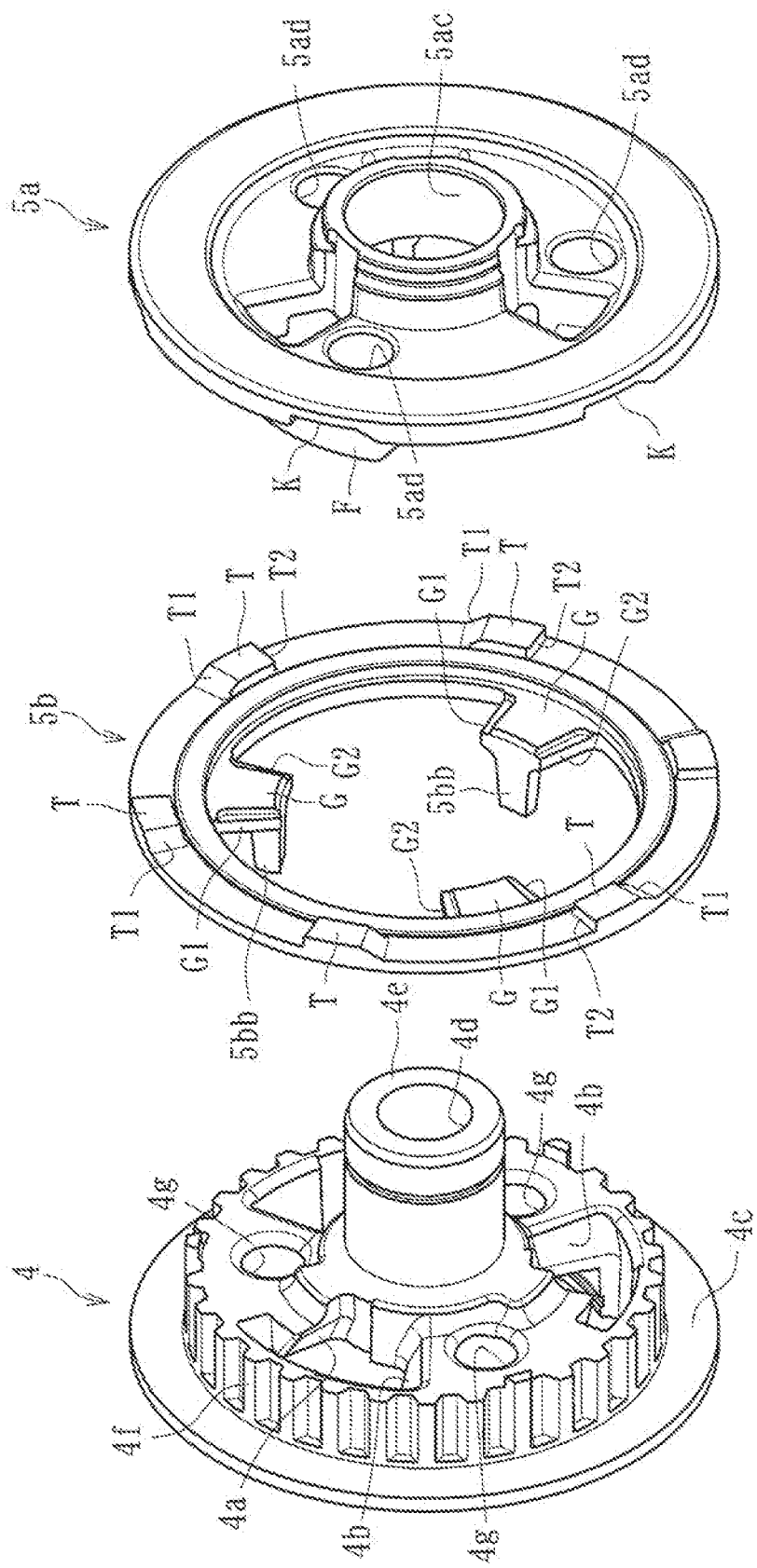
[Fig. 9]

[Fig. 10]
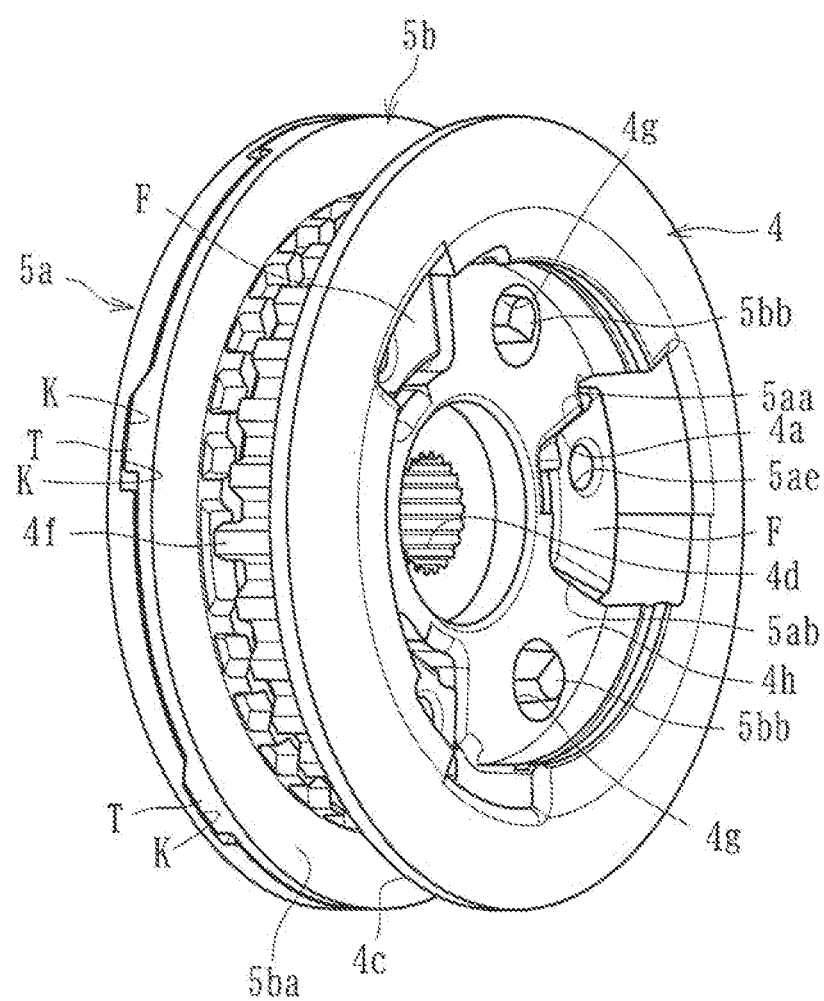

[Fig. 11]
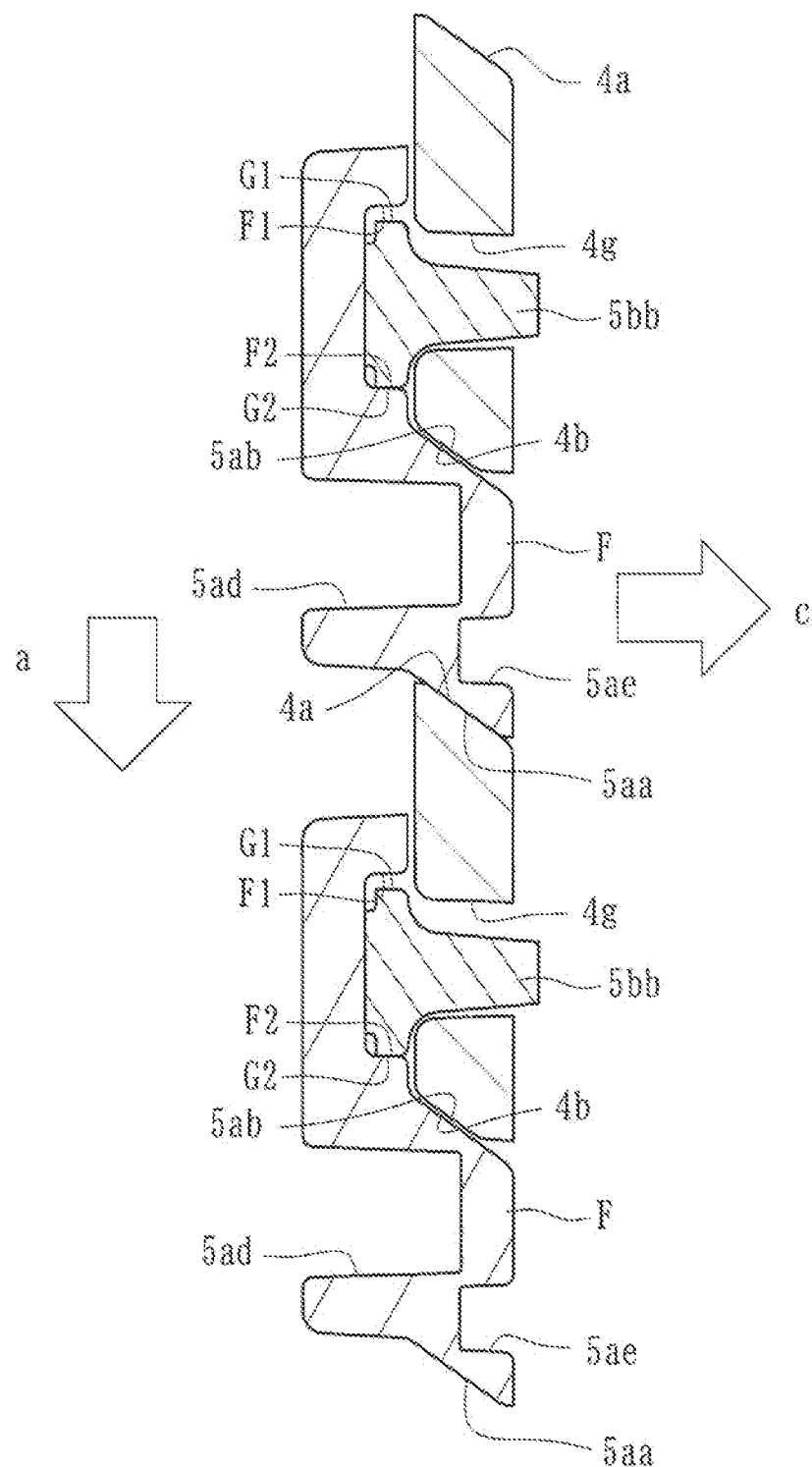

[Fig. 12]
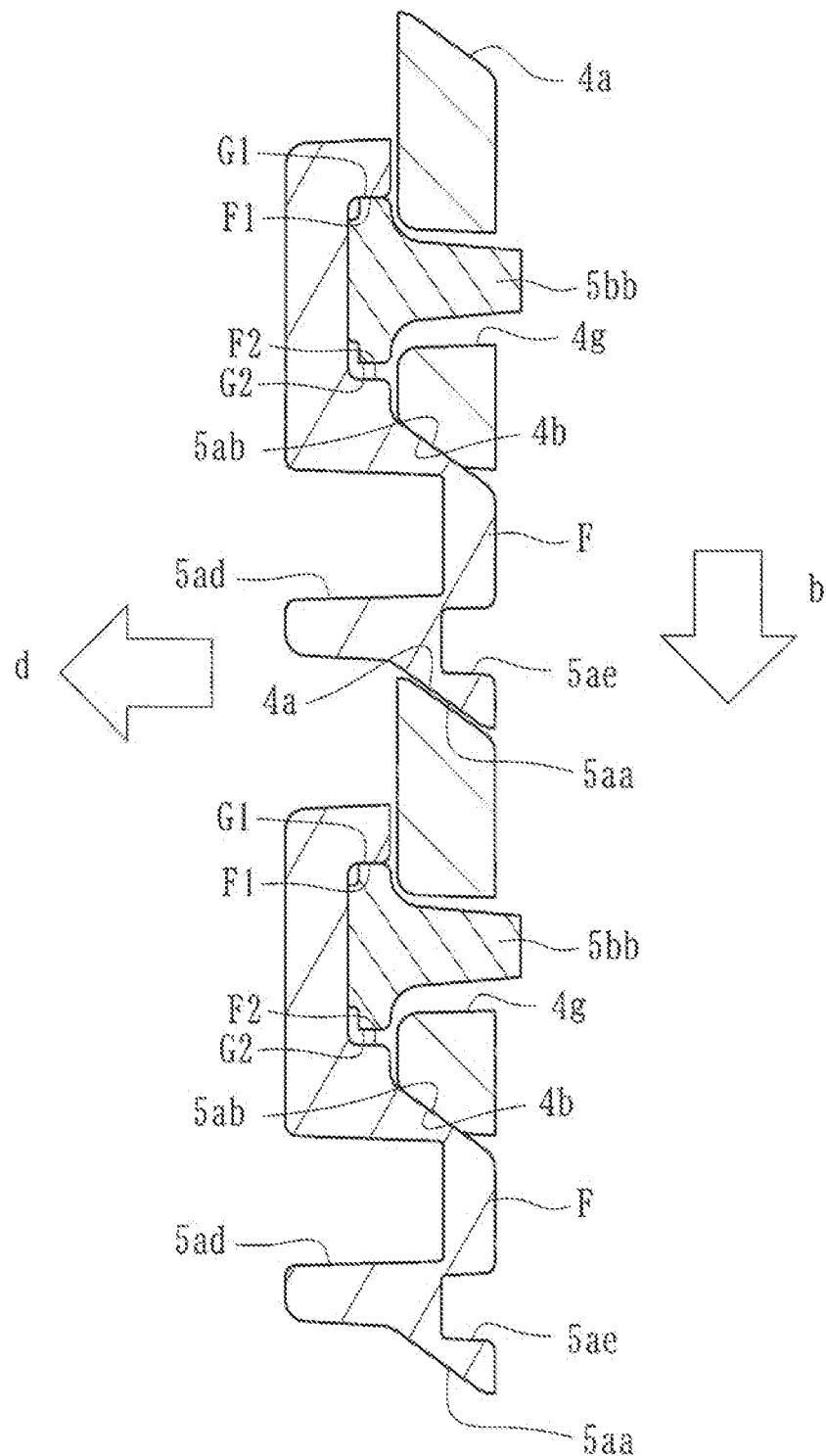

[Fig. 13]
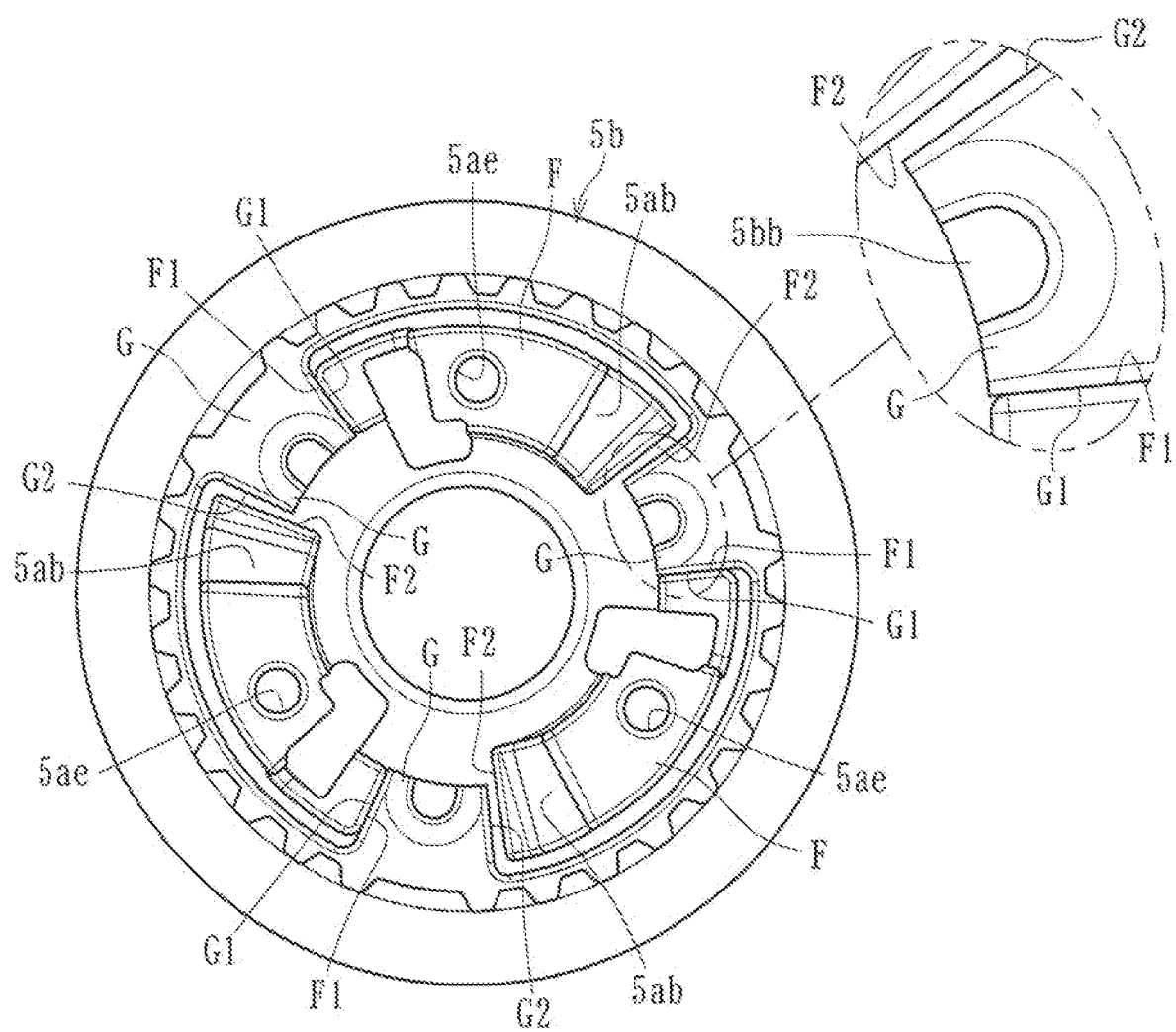

[Fig. 14]
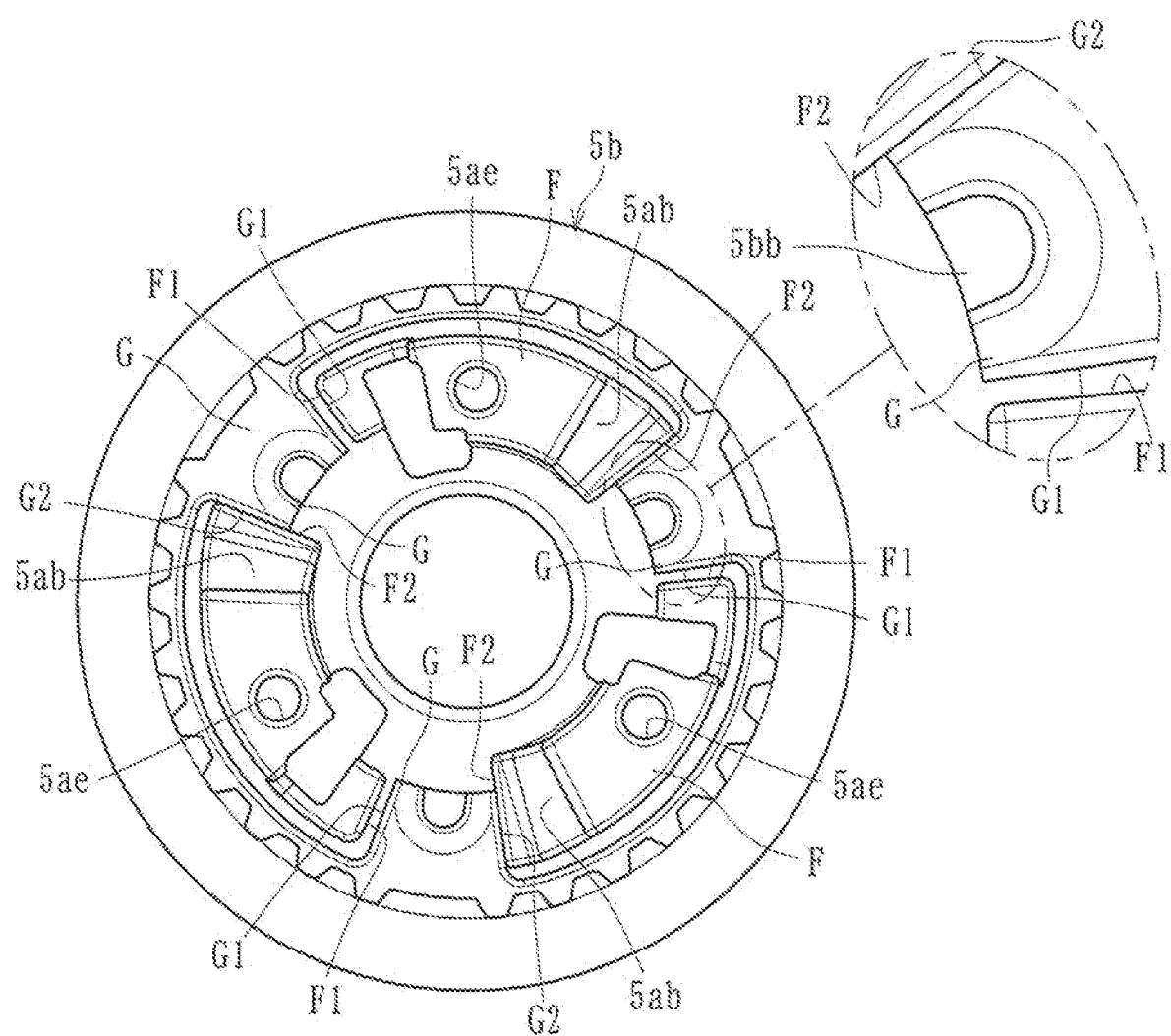

[Fig. 15]
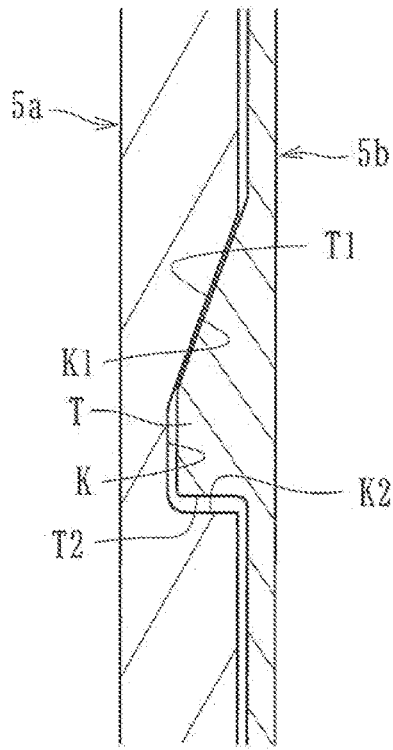
[Fig. 16]
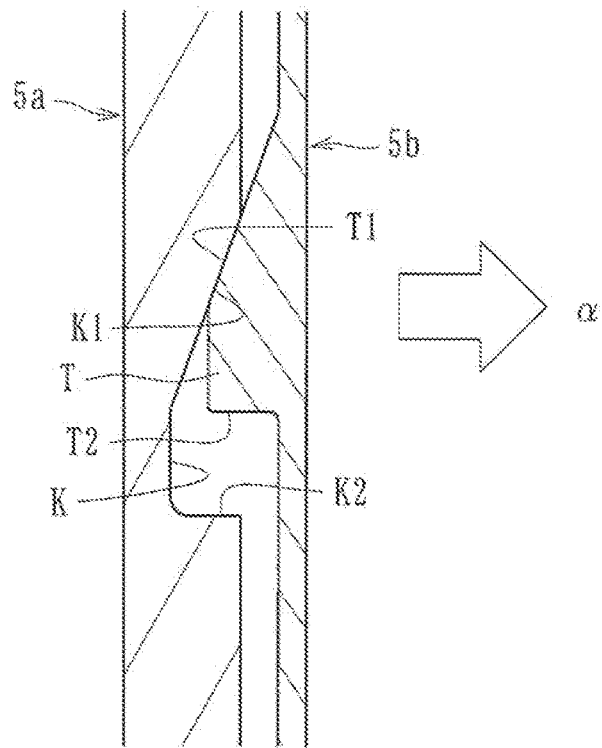

[Fig. 17]
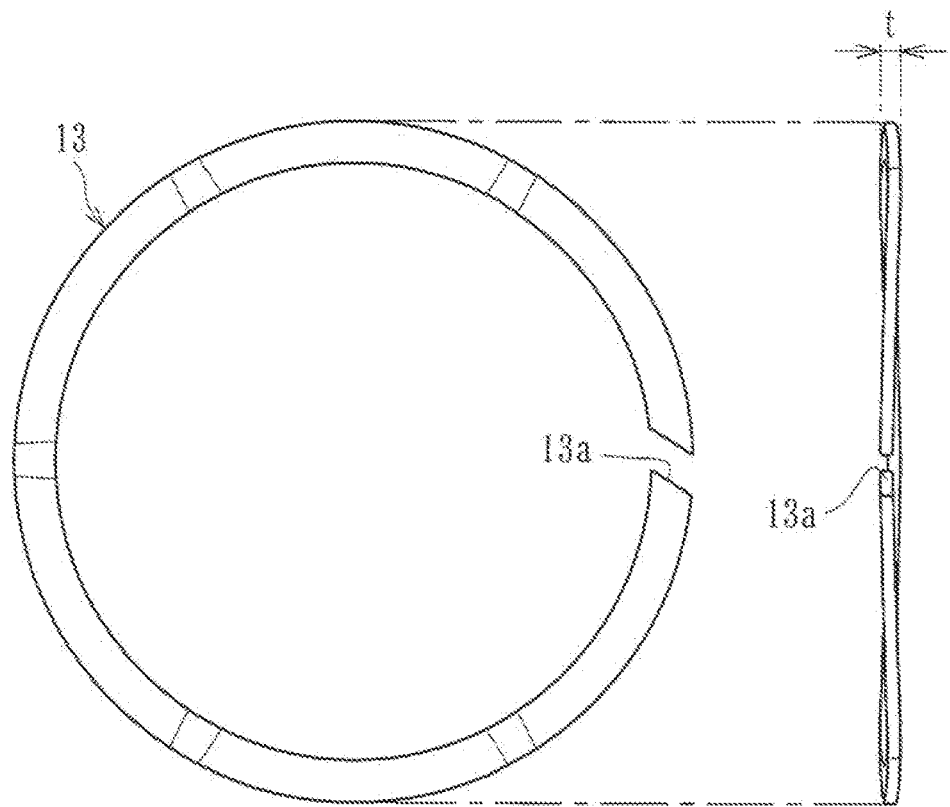
[Fig. 18]
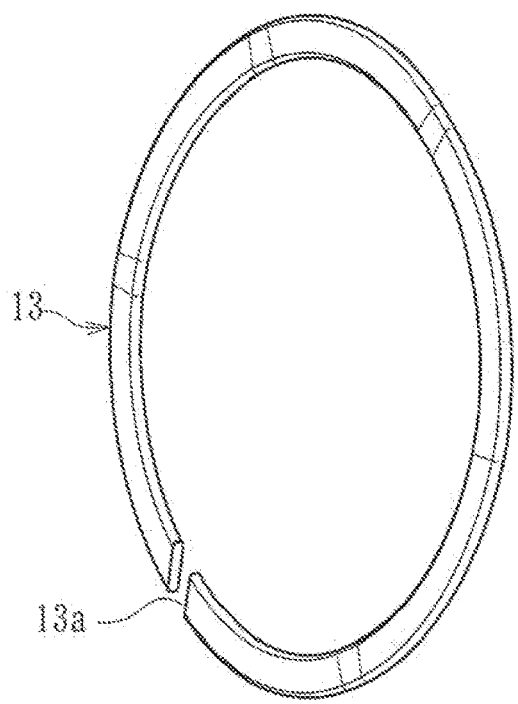

[Fig. 19]
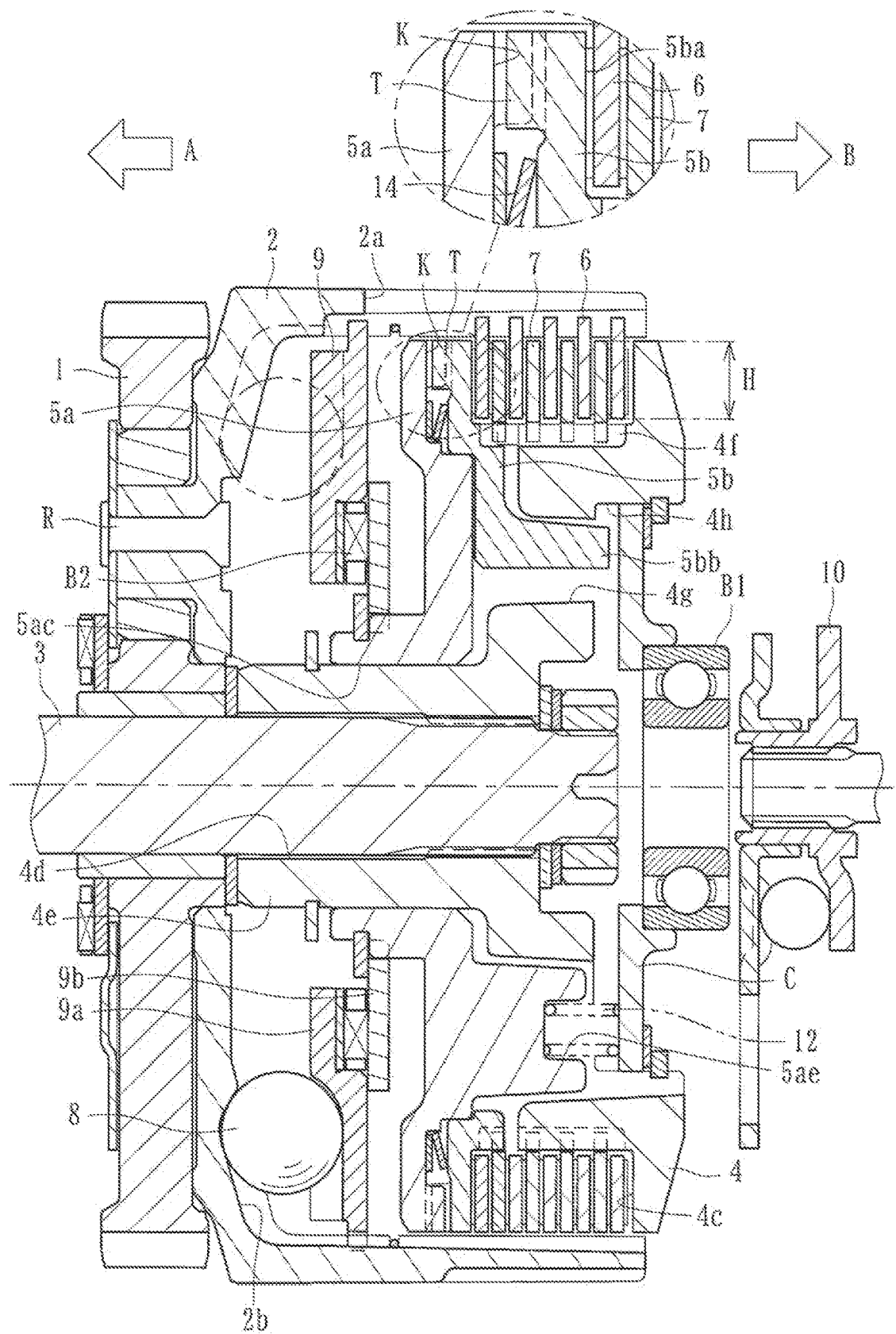

[Fig. 20]
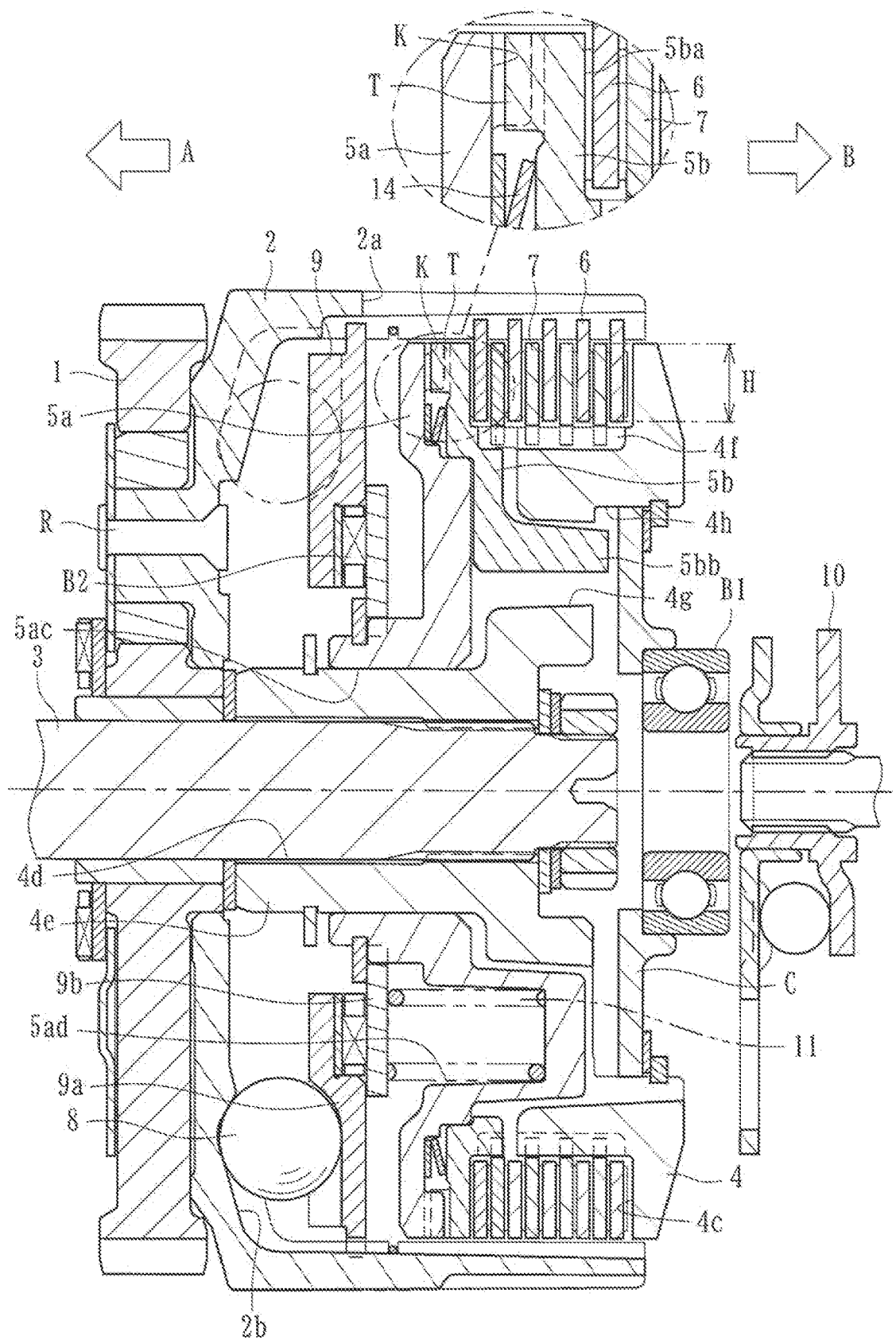

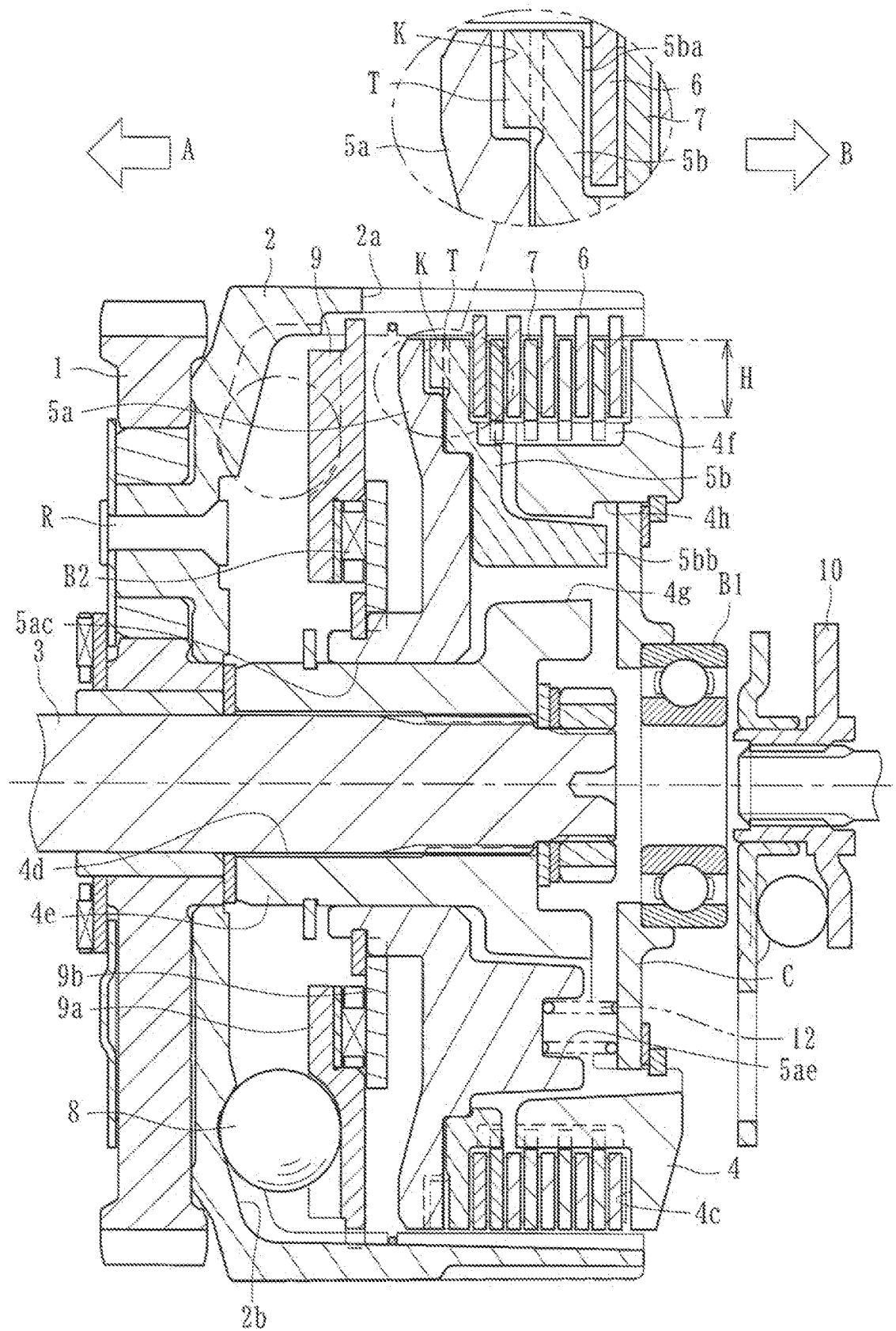
[Fig. 21]

[Fig. 22]
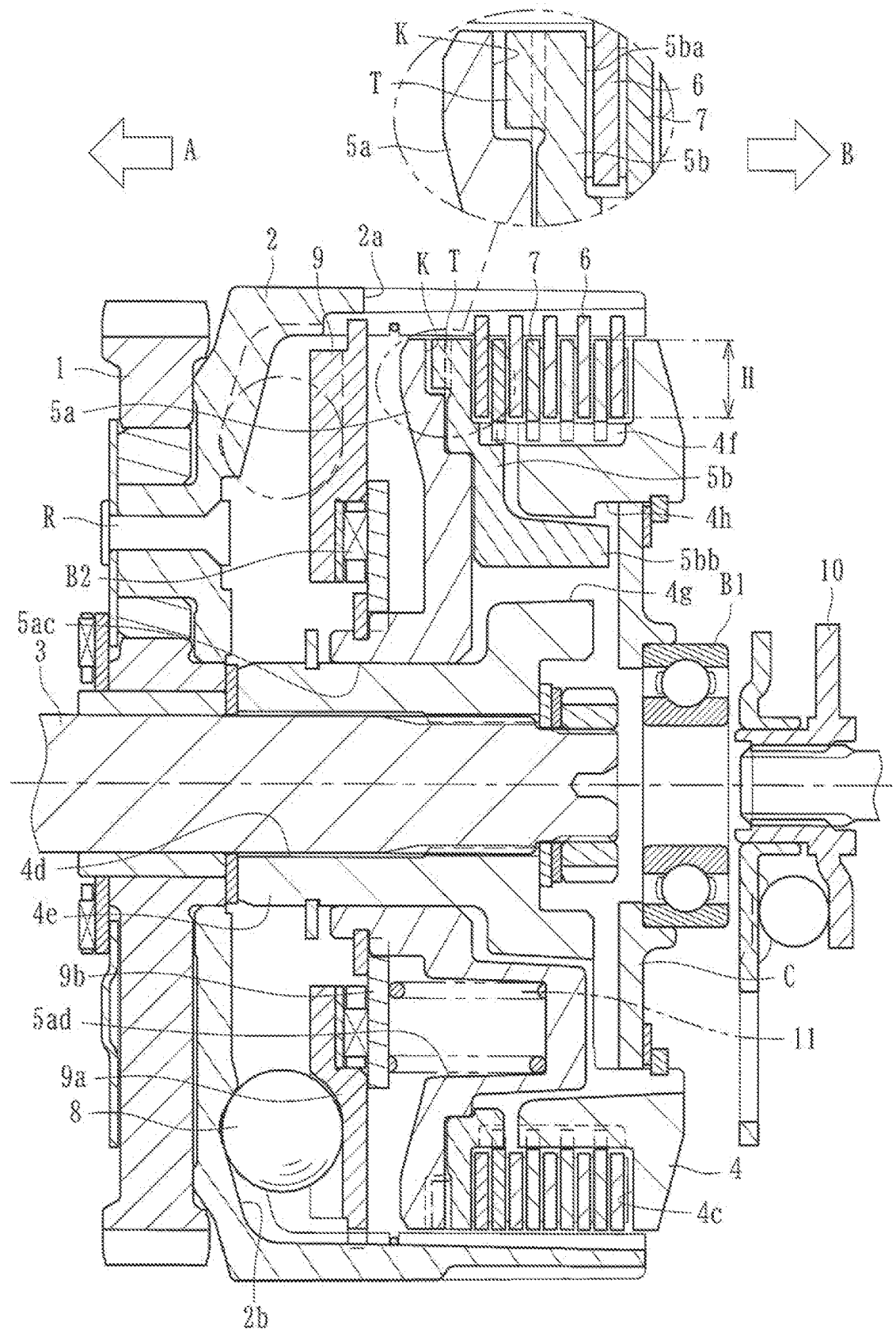

[Fig. 23]
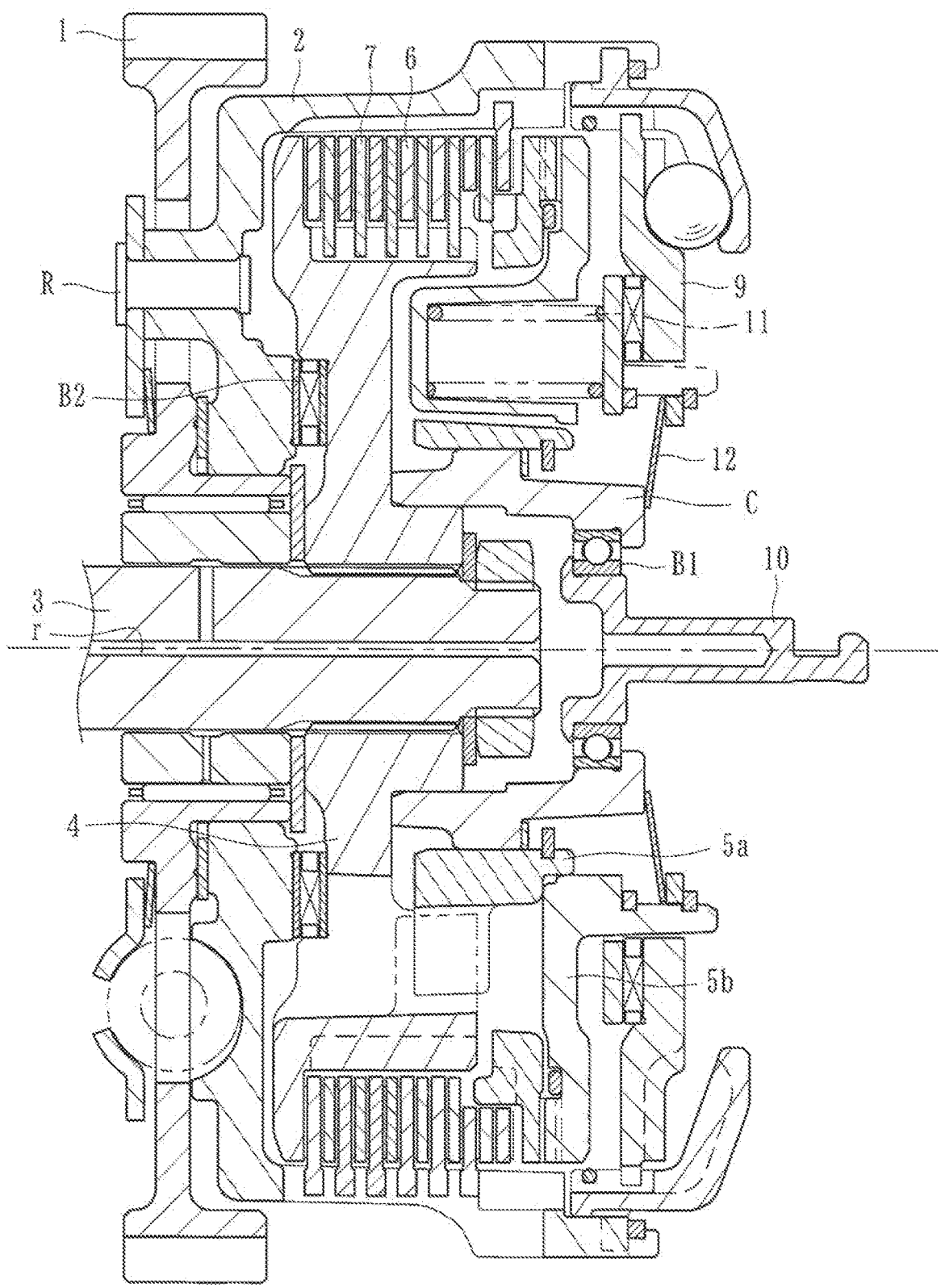

POWER TRANSMISSION DEVICE

CROSS-REFERENCE TO RELATED APPLICATIONS

This application is a continuation of U.S. application Ser. No. 17/336,479, filed Jun. 2, 2021, which is a continuation of International Application No. PCT/JP2019/047409, filed Dec. 4, 2019, which claims priority to Japanese Application No. 2018-227996, filed Dec. 5, 2018. The disclosures of the above applications are incorporating herein by reference.

FIELD

The present disclosure relates to a power transmission device that can appropriately transmit or stop transmitting rotational power of an input member to an output member.

BACKGROUND

In general, a motorcycle has a power transmission device that is used to appropriately transmit or stop transmitting the engine driving power to a transmission and a driving wheel. The power transmission device includes an input member, coupled to the engine side, an output member, coupled to the transmission and driving wheel side, a clutch member, coupled to an output member, and a pressure member that is capable of moving toward or away from the clutch member. The power transmission device is configured to transmit power by moving the pressure member toward the clutch member to press a drive-side clutch plate and a driven-side clutch plate against each other. Also, it is configured to stop transmitting the power by moving the pressure member away from the clutch member to release a press-contact force between the drive-side clutch plate and the driven-side clutch plate.

Among existing power transmission devices, as disclosed in, for example, Japanese Unexamined Patent Application Publication No. 2017-155884, a power transmission device includes a weight member. The weight member can press a drive-side clutch plate and a driven-side clutch plate against each other by moving from a radially-inner position to a radially-outer position in a groove portion due to a centrifugal force generated as a clutch housing rotates. With the existing power transmission device, because the clutch housing rotates as the engine is driven, it is possible to apply a centrifugal force to the weight member and to transmit the engine driving power to a wheel by pressing the drive-side clutch plate and the driven-side clutch plate against each other.

As disclosed in, for example, Japanese Unexamined Patent Application Publication No. 2017-155884, another existing power transmission device has a cam mechanism composed of an elongated hole 32 and a pin 30. Even when the weight member is located at the radially-inner position, the power transmission device can press the drive-side clutch plate and the driven-side clutch plate against each other to apply an engine brake by moving a clutch hub 13 in the axial direction while rotating the clutch hub 13 by using the cam. The cam is composed of the elongated hole 32 and the pin 30, and thereby moves a pressing flange 28 toward the clutch plates.

SUMMARY

With the existing power transmission device, when an engine brake is to be applied, the cam mechanism, including the elongated hole 32 and the pin 30, can be used to press the drive-side clutch plate and the driven-side clutch plate against each other to engage the clutch. Thus, power on the wheel side can be transmitted to the engine side. However, the existing power transmission device has a problem in that, when the clutch is operated to release a press-contact force between the clutch plates (to disengage the clutch) in a state where an engine brake is applied, the clutch operation amount becomes large and it is not possible to smoothly operate the clutch.

The present disclosure overcomes the deficiencies to the prior art. It is an object to provide a power transmission device that allows a clutch operation to be smoothly performed in a state where an engine brake is applied.

According to the disclosure, a power transmission device comprises a clutch housing that rotates together with an input member. The input member is rotated by vehicle engine driving power. The clutch housing includes a plurality of drive-side clutch plates. A clutch member includes a plurality of driven-side clutch plates that are alternately formed with the drive-side clutch plates of the clutch housing. The clutch member is coupled to an output member that is capable of rotating a wheel of the vehicle. A pressure member is movable between an active position and an inactive position. In the active position, the pressure member presses the drive-side clutch plates and the driven-side clutch plates against each other to be able to transmit the engine driving power to the wheel. In the inactive position, the pressure member releases a press-contact force between the drive-side clutch plates and the driven-side clutch plates to be able to stop transmitting the engine driving power to the wheel. A weight member is disposed in a groove portion extending in a radial direction of the clutch housing. The weight member is movable from a radially-inner position to a radially-outer position in the groove portion due to a centrifugal force generated by rotation of the clutch housing. An interlocking member moves the pressure member from the inactive position to the active position as the weight member moves from the radially-inner position to the radially-outer position. An activation member moves the pressure member in a direction such that a press-contact force between the drive-side clutch plates and the driven-side clutch plates is enabled to be released. The pressure member includes a first pressure member, a second pressure member and a back-torque transmitting cam. The first pressure member moves in a direction such that the first pressure member presses the drive-side clutch plates and the driven-side clutch plates against each other by receiving a pressing force of the interlocking member. The second pressure member moves in a direction such that the second pressure member releases a press-contact force between the drive-side clutch plates and the driven-side clutch plates by receiving an activation force of the activation member. The back-torque transmitting cam moves the second pressure member relative to the first pressure member to keep pressing the drive-side clutch plates and the driven-side clutch plates against each other when a rotational force is input to the clutch member, via the output member in a process where the weight member moves from the radially-outer position to the radially-inner position and the first pressure member moves to follow the interlocking member.

According to the disclosure, in the power transmission device, a movement direction where the second pressure member is moved by the back-torque transmitting cam and a movement direction where the second pressure member is moved by activation of the activation member are opposite to each other.

According to the disclosure, in the power transmission device, the back-torque transmitting cam is formed in an outer peripheral edge part of each of the first pressure member and the second pressure member.

According to the disclosure, in the power transmission device, the back-torque transmitting cam moves the second pressure member by pressing a slide area of the second pressure member over which the drive-side clutch plates and the driven-side clutch plates slide.

According to the disclosure, in the power transmission device, a release spring holds the pressure member at the inactive position. The release spring is compressed as the interlocking member moves and the pressure member moves from the inactive position toward the active position. The release spring applies an urging force while allowing movements of the interlocking member and the pressure member until the drive-side clutch plates and the driven-side clutch plates reach an engaged state before the drive-side clutch plates and the driven-side clutch plates are pressed against each other. A clutch spring is compressed in a process where the interlocking member moves after the drive-side clutch plates and driven-side clutch plates have reached the engaged state. The clutch spring applies a press-contact force between the drive-side clutch plates and the driven-side clutch plates while allowing movement of the interlocking member. A cushioning member is interposed between the first pressure member and the second pressure member. The cushioning member, by being compressed, applies an urging force while allowing movement of the interlocking member in a process where the interlocking member moves and the pressure member moves from the inactive position toward the active position.

According to the disclosure, in the power transmission device, the cushioning member is a wave spring including a C-shaped member with a cutout portion in a part of an annular shape. The back-torque transmitting cam suuports an outer peripheral surface of the wave spring.

According to the disclosure, in the power transmission device, a torque transmitting portion is formed in each of the first pressure member and the second pressure member. The torque transmitting portion transmits a rotational force, which has been transmitted to the second pressure member, to the first pressure member without using the back-torque transmitting cam.

According to the disclosure, it is possible to allow a clutch operation to be smoothly performed in a state where an engine brake is applied. The pressure member includes a first pressure member, a second pressure member and a back-torque transmitting cam. The first pressure member moves in a direction such that the first pressure member presses the drive-side clutch plates and the driven-side clutch plates against each other by receiving a pressing force of the interlocking member. The second pressure member moves in a direction such that the second pressure member releases a press-contact force between the drive-side clutch plates and the driven-side clutch plates by receiving an activation force of the activation member. The back-torque transmitting cam moves the second pressure member relative to the first pressure member to keep pressing the drive-side clutch plates and the driven-side clutch plates against each other when a rotational force is input to the clutch member via the output member in a process where the weight member moves from the radially-outer position to the radially-inner position and the first pressure member moves to follow the interlocking member.

According to the disclosure, it is possible to make the activation force amount, by the activation member, smaller when a clutch operation is performed by using the activation member in a state where an engine brake is applied. The movement direction where the second pressure member is moved by the back-torque transmitting cam and the movement direction where the second pressure member is moved by activation of the activation member are opposite to each other.

According to the disclosure, it is possible to generate a larger thrust force due to the cam and to more reliably press the drive-side clutch plates and the driven-side clutch plates against each other when an engine brake is to be applied. The back-torque transmitting cam is formed in an outer peripheral edge part of each of the first pressure member and the second pressure member.

According to the disclosure, it is possible to efficiently convert a thrust force generated by the cam into a press-contact force between the drive-side clutch plates and the driven-side clutch plates and to more reliably press the drive-side clutch plates and the driven-side clutch plates against each other when an engine brake is to be applied. The back-torque transmitting cam moves the second pressure member by pressing the slide area of the second pressure member over which the drive-side clutch plates and the driven-side clutch plates slide.

According to the disclosure, it is possible to suppress a feeling of surprise when power is transmitted and to improve operability. The power transmission device includes, in addition to the release spring and the clutch spring, the cushioning member interposed between the first pressure member and the second pressure member. The cushioning member, by being compressed, applies an urging force while allowing movement of the interlocking member in a process where the interlocking member moves and the pressure member moves from the inactive position toward the active position.

According to the disclosure, it is possible for the back-torque transmitting cam to have both a function of allowing the second pressure member to keep pressing the drive-side clutch plates and the driven-side clutch plates against each other and a function of preventing the wave spring from expanding in the radially-outward direction by receiving a centrifugal force while supporting the wave spring. The cushioning member is a wave spring with a C-shaped member having the cutout portion in a part of an annular shape. The back-torque transmitting cam supports the outer peripheral surface of the wave spring.

According to the disclosure, it is possible to allow power transmission to be stably performed. The power transmission device includes a torque transmitting portion, formed in each of the first pressure member and the second pressure member, transmits a rotational force that has been transmitted to the second pressure member, to the first pressure member without using the back-torque transmitting cam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective external view of a power transmission device.

FIG. 2 is a cross-sectional view of the internal structure of the power transmission device.

FIG. 3 is a cross-sectional view of the internal structure of the power transmission device.

FIG. 4 is a perspective view of a clutch housing of the power transmission device.

FIG. 5 is a three-side plan and elevation view of a clutch member.

FIG. 6 is a three-side plan and elevation view of a first pressure member.

FIG. 7 is a three-side plan and elevation plan view and elevation of a second pressure member.

FIG. 8 is an enlarged perspective view of the clutch member, the first pressure member, and the second pressure member before being assembled.

FIG. 9 is an exploded perspective view of the clutch member, the first pressure member, and the second pressure member before being assembled.

FIG. 10 is a perspective view of the clutch member, the first pressure member, and the second pressure member after assembly.

FIG. 11 is a cross-section view of the function of a press-contact assisting cam.

FIG. 12 is a cross-section view of the function of a back-torque limiter cam.

FIG. 13 is a plan view of the first pressure member and the second pressure member assembled together, in a state where one side surface of a protruding portion and a first contact surface (torque transmitting portion) are in contact with each other.

FIG. 14 is a plan view of the first pressure member and the second pressure member assembled together, in a state where the other side surface of the protruding portion and a second contact surface (movement-amount limiting portion) are in contact with each other.

FIG. 15 is a cross-section view of the function of a back-torque transmitting cam in a state before the back-torque transmitting cam starts working.

FIG. 16 is a cross-section view of the function of the back-torque transmitting cam in a state after the back-torque transmitting cam has started working.

FIG. 17 is a plan view and a side view of a cushioning member.

FIG. 18 is a perspective view of the cushioning member.

FIG. 19 is a longitudinal sectional view of a power transmission device according to another embodiment of the present disclosure.

FIG. 20 is a longitudinal sectional view of a power transmission device according to another embodiment of the present disclosure.

FIG. 21 is a longitudinal sectional view of a power transmission device according to still another embodiment of the present disclosure.

FIG. 22 is a longitudinal sectional view of a power transmission device according to still another embodiment of the present disclosure.

FIG. 23 is a longitudinal sectional view of a power transmission device according to still another embodiment of the present disclosure.

DETAILED DESCRIPTION

Hereafter, an embodiment of the present disclosure will be described in detail with reference to the drawings.

A power transmission device according to the present embodiment is a device that is disposed in a vehicle, such as a motorcycle, and is used to appropriately transmit or to stop transmitting the engine driving power to a transmission or toward the driving wheel side. As illustrated in FIGS. 1 to 10, the power transmission device mainly includes a clutch housing 2 with an input gear 1 (input member) rotated by the vehicle engine driving power; a clutch member 4; a first pressure member 5a; a second pressure member 5b; a plurality of drive-side clutch plates 6; a plurality of driven-side clutch plates 7; a weight member 8, including steel ball members that can move (roll) in the radial direction in the clutch housing 2; an interlocking member 9; and an activation member 10, that can be activated by hand or by an actuator (not shown). The symbol B1 in the figure shows a ball bearing. The symbol B2 shows a thrust bearing.

The input gear 1 can rotate around an output shaft 3 when the driving power (a rotational force) transmitted from the engine is input. The input gear 1 is coupled to the clutch housing 2, via a rivet R, or the like. The clutch housing 2 includes a cylindrical member whose right side, in FIGS. 2 and 3, is open. The clutch housing is coupled to the input gear 1. The clutch housing 2 can rotate together with the rotation of the input gear 1 due to the engine driving power.

As illustrated in FIGS. 1 and 4, a plurality of cutouts 2a are formed in the clutch housing 2 and arranged in the circumferential direction. The plurality of drive-side clutch plates 6 are attached and fit into the cutouts 2a. Each of the drive-side clutch plates 6 is a substantially annular plate material, rotates together with the rotation of the clutch housing 2 and slides in the axial direction (the left-right direction in FIGS. 2 and 3).

Moreover, as illustrated in FIG. 4, a plurality of groove portions 2b, extending in the radial direction, are formed in the bottom surface of the clutch housing 2. The weight member 8 is disposed in each of the groove portions 2b. In a state where the clutch housing 2 is stopped (an engine stop or idling state) and in a state where the clutch housing 2 is rotating at a low speed, the weight member 8 is located at a radially-inner position. In a state where the clutch housing 2 is rotating at a high speed, the weight member 8 is located at a radially-outer position.

The plurality of driven-side clutch plates 7, alternately formed with the drive-side clutch plates 6 of the clutch housing 2, are attached to the clutch member 4. The clutch member 4 is coupled to the output shaft 3 (output member) that can rotate the wheel of the vehicle. As illustrated in FIG. 5, in the clutch member 4, a flange surface 4c is formed along the peripheral edge part. The clutch member 4 is configured so that the output shaft 3 is inserted into an insertion hole 4d formed at its center. The clutch member 4 and the output shaft 3 are coupled to each other in the rotational direction as gears, respectively, formed therein mesh with each other.

As illustrated in FIGS. 5 and 9, an inclined surface 4a, constituting a press-contact assisting cam, and an inclined surface 4b, constituting a back-torque limiter cam, are formed in the clutch member 4 according to the present embodiment. Moreover, a spline-fitting portion 4f is formed in an outer peripheral surface of the clutch member 4. The driven-side clutch plates 7 are attached by spline fitting to the spline-fitting portion 4f.

As illustrated in FIGS. 8 to 10, the first pressure member 5a and the second pressure member 5b are assembled with the clutch member 4. The plurality of drive-side clutch plates 6 and the driven-side clutch plates 7, in an alternately stacked state, are attached between a flange surface 5ba of the second pressure member 5b and the flange surface 4c of the clutch member 4. A boss portion 4e, protruding in the axial direction, is formed at the center of the clutch member 4. The insertion hole 4d is formed inside of the boss portion 4e in the longitudinal direction.

The clutch member 4, the first pressure member 5a, and the second pressure member 5b are assembled by inserting the boss portion 4e of the clutch member 4 into an insertion hole 5ac of the first pressure member 5a while interposing the second pressure member 5b between the clutch member 4 and the first pressure member 5a. In the clutch member 4, a through-hole 4g is formed for receiving a projecting portion 5bb, that protrudes from the second pressure member 5b. An attachment portion 4h, for attaching a bearing holding member C, is formed in the clutch member, in a state where the first pressure member 5a and the second pressure member 5b are assembled.

The pressure member (5a, 5b) is movable between an active position and an inactive position. In the active position, the pressure member presses the drive-side clutch plates 6 and the driven-side clutch plates 7 against each other to be able to transmit the engine driving power to the wheel. In the inactive position, the pressure member releases the press-contact force between the drive-side clutch plates 6 and the driven-side clutch plates 7 to be able to stop transmitting the engine driving power to the wheel. In the present embodiment, the pressure member (5a, 5b) includes the first pressure member 5a and the second pressure member 5b.

The first pressure member 5a moves in a direction such that the first pressure member 5a presses the drive-side clutch plates 6 and the driven-side clutch plates 7 against each other by receiving a pressing force of the interlocking member 9. As illustrated in FIGS. 6 and 8, an inclined surface 5aa, constituting a press-contact assisting cam, and an inclined surface 5ab, constituting a back-torque limiter cam, are formed in the first pressure member 5a. The first pressure member 5a includes a cylindrical member where the insertion hole 5ac is formed at the center. The boss portion 4e of the clutch member 4 is inserted during assembly into the insertion hole 5ac.

Moreover, formed in the first pressure member 5a, is an attachment recessed portion 5ad, attaching a clutch spring 11, and an attachment recessed portion 5ae, attaching a release spring 12. As illustrated in FIGS. 2 and 3, the clutch spring 11 is held between the first pressure member 5a and the interlocking member 9. Thus, the clutch spring 11 can be compressed. The release spring 12 is held between the first pressure member 5a and the bearing holding member C. Thus, the release spring 12 can be compressed.

The second pressure member 5b can move in a direction such that the second pressure member 5b releases a press-contact force between the drive-side clutch plates 6 and the driven-side clutch plates 7 by receiving an activation force of the activation member 10. As illustrated in FIGS. 7 to 9, the second pressure member 5b includes an annular member where the flange surface 5ba and the projecting portion 5bb are formed. In a state where the first pressure member 5a, the second pressure member 5b, and the clutch member 4 are assembled, the drive-side clutch plates 6 and the driven-side clutch plates 7, in a stacked state, are held between the flange surface 4c of the clutch member 4 and the flange surface 5ba of the second pressure member 5b.

When the first pressure member 5a and the second pressure member 5b move in the direction B in FIGS. 2 and 3 and reach the active position, the drive-side clutch plates 6 and the driven-side clutch plates 7 are pressed against each other to be able to transmit the vehicle engine driving power. When the first pressure member 5a and the second pressure member 5b move in the direction A in FIGS. 2 and 3 and reach the inactive position, the press-contact force between the drive-side clutch plates 6 and the driven-side clutch plates 7 is released to be able to stop transmitting the vehicle engine driving power to the wheel.

That is, in the state where the drive-side clutch plates 6 and the driven-side clutch plates 7 are pressed against each other, a rotational force (driving power of the engine) input to the clutch housing 2 is transmitted to the wheel side via the output shaft 3 (output member). In the state where the press contact between the drive-side clutch plates 6 and the driven-side clutch plates 7 is released, a rotational force (driving power of the engine) input to the clutch housing 2 can be stopped to be transmitted to the output shaft 3 (output member).

Moreover, as illustrated in FIGS. 6 to 9, in the present embodiment, the inclined surfaces 4a and 4b are formed in the clutch member 4. The inclined surfaces 5aa and 5ab are formed in the first pressure member 5a. In a state where the first pressure member 5a, the second pressure member 5b, and the clutch member 4 are assembled, the inclined surface 4a and the inclined surface 5aa face each other, constituting a press-contact assisting cam, and the inclined surface 4b and the inclined surface 5ab face each other, constituting a back-torque limiter cam.

As illustrated in FIG. 11, a rotational force in the direction (a) is applied to the first pressure member 5a when the rotational speed of the engine increases and a rotational force input to the input gear 1 and the clutch housing 2 becomes capable of being transmitted to the output shaft 3 via the clutch member 4 (the weight member 8 is at the radially-outer position). Therefore, a force in the direction (c) in the figure is generated in the first pressure member 5a due to the function of the press-contact assisting cam. Thus, the first pressure member 5a and the second pressure member 5b move in a direction (direction B in FIGS. 2 and 3) such that the flange surface 5ba of the second pressure member 5b moves further toward the flange surface 4c of the clutch member 4. The first pressure member 5a and the second pressure member 5b increase the press-contact force between the drive-side clutch plates 6 and the driven-side clutch plates 7.

On the other hand, while the vehicle is traveling, when the rotational speed of the output shaft 3 exceeds the rotational speed of the input gear 1 and the clutch housing 2 and a back torque in the direction (b) in FIG. 12 is generated, due to the function of the back-torque limiter cam, the first pressure member 5a is moved in the direction (d) in the figure to release the press-contact force between the drive-side clutch plates 6 and the driven-side clutch plates 7. Thus, it is possible to avoid damage to the power transmission device and the power source (engine side) due to the back torque.

The weight member 8 is disposed in the groove portion 2b (see FIG. 4) extending in the radial direction of the clutch housing 2. The weight member 8 moves from a radially-inner position to a radially-outer position in the groove portion 2b due to a centrifugal force generated by the rotatin clutch housing 2. This presses the drive-side clutch plates 6 and the driven-side clutch plates 7 against each other. That is, the rolling surface (bottom surface) of the groove portions 2b on which the weight member 8 rolls has an upward inclination from the radially-inner position toward the radially-outer position. When the clutch housing 2 is stopped, the weight member 8 is held at the radially-inner position due to an urging force of the release spring 12. When the clutch housing 2 rotates, a centrifugal force is applied to the weight member 8 and moves the weight member 8 along the upward inclination to the radially-outer position as the clutch housing 2 reaches a predetermined rotational speed.

The interlocking member 9 includes a first interlocking member 9a and a second interlocking member 9b disposed in the clutch housing 2. The interlocking member 9 is fit and coupled to the clutch housing 2, is rotatable together with the clutch housing 2, and is movable in the left-right direction in FIGS. 2 and 3. A thrust bearing B2 is interposed and attached between the first interlocking member 9a and the second interlocking member 9b. The first interlocking member 9a and the second interlocking member 9b are independently rotatable. As the weight member 8 moves from the radially-inner position to the radially-outer position, the first interlocking member 9a and the second interlocking member 9b move together in the direction B in FIGS. 2 and 3 against an urging force of the release spring 12. They can press the first pressure member 5a and the second pressure member 5b to move the first pressure member 5a and the second pressure member 5b from the inactive position to the active position.

The activation member 10 includes a member that can be operated by hand or by using an actuator (see FIGS. 2 and 3). It moves the first pressure member 5a and the second pressure member 5b in a direction (in the direction A in FIGS. 2 and 3) such that the press-contact force between the drive-side clutch plates 6 and the driven-side clutch plates 7 can be released. When a shifting operation is performed, for example, by an operation on a clutch pedal, a clutch lever, or the like of the vehicle, or by working of an actuator, the activation member 10 moves in the direction A in FIGS. 2 and 3 to contact the tip of the projecting portion 5bb of the second pressure member 5b via the bearing holding member C and moves the second pressure member 5b from the active position to the inactive position. Thus, the activation member 10 can disengage the clutch (stop transmitting the power) by releasing the press-contact force between the drive-side clutch plates 6 and the driven-side clutch plates 7.

Moreover, as illustrated in FIG. 2, the bearing holding member C, according to the present embodiment, holds the release spring 12 between the bearing holding member C and the first pressure member 5a. The release spring 12 can hold the first pressure member 5a at the inactive position. The release spring 12 is compressed as the interlocking member 9 moves and the first pressure member 5a and the second pressure member 5b move from the inactive position toward the active position. The release spring 12 can apply an urging force while allowing movements of the interlocking member 9, the first pressure member 5a, and the second pressure member 5b until the drive-side clutch plates 6 and the driven-side clutch plates 7 reach an engaged state before being pressed against each other (a state in which the distance between the drive-side clutch plates 6 and the driven-side clutch plates 7 is zero and immediately before power transmission due to pressed contact is performed).

The clutch spring 11 includes a coil spring interposed between the interlocking member 9 and the first pressure member 5a. As the interlocking member 9 moves, the clutch spring 11 can press the first pressure member 5a and the second pressure member 5b to move the pressure member (5a, 5b) in a direction such that the drive-side clutch plates 6 and the driven-side clutch plates 7 are pressed against each other. Moreover, when the activation member 10 is working, the clutch spring 11 can absorb the pressing force that the first pressure member 5a and the second pressure member 5b apply to the interlocking member 9.

The clutch spring 11 according to the present embodiment moves together with the first pressure member 5a and the second pressure member 5b without being compressed (deformed), until the drive-side clutch plates 6 and the driven-side clutch plates 7 reach the engaged state described above. After the drive-side clutch plates 6 and the driven-side clutch plates 7 have reached the engaged state, the clutch spring 11 is compressed in the process where the interlocking member 9 moves, and can apply a press-contact force between the drive-side clutch plates 6 and the driven-side clutch plates 7 while allowing movement of the interlocking member 9.

That is, when the weight member 8 moves from an radially-inner position to the radially-outer position and the interlocking member 9 is pressed by the weight member 8 as the clutch housing 2 rotates, the pressing force is transmitted to the first pressure member 5a and the second pressure member 5b via the clutch spring 11. This moves the first pressure member 5a and the second pressure member 5b in the direction B in FIGS. 2 and 3 and presses the drive-side clutch plates 6 and the driven-side clutch plates 7 against each other. When the activation member 10 is activated in this state, although the first pressure member 5a and the second pressure member 5b move in the direction A in the figures due to the pressing force of the activation member 10, the pressing force applied to the interlocking member 9 is absorbed by the clutch spring 11, and the position of the interlocking member 9 (the position of the weight member 8) is maintained.

Here, the power transmission device according to the present embodiment includes a back-torque transmitting cam (cam surfaces K1 and T1) that moves the second pressure member 5b relative to the first pressure member 5a to keep pressing the drive-side clutch plates 6 and the driven-side clutch plates 7 against each other. When a rotational force is input to the clutch member 4, via the output shaft 3, in the process where the weight member 8 moves from the radially-outer position to the radially-inner position, the first pressure member 5a moves to follow the interlocking member 9. As illustrated in FIGS. 6 to 9, the back-torque transmitting cam includes cam surfaces (K1, T1) that are respectively integrally formed in mating surfaces of the first pressure member 5a and the second pressure member 5b (mating surfaces when combined).

The cam surface K1 includes a plurality of inclined surfaces formed so as to be arranged in the circumferential direction of the outer peripheral edge part of the first pressure member 5a. The cam surface K1 is formed in one end surface of each of a plurality of groove portions K that are annularly formed along the outer peripheral edge part of the first pressure member 5a. That is, the plurality of groove portions K are formed in the outer peripheral edge part of the first pressure member 5a so as to be arranged in the circumferential direction, and one end surface of each groove portion K is an inclined surface that constitutes the cam surface K1 of the back-torque transmitting cam. The other end surface of each groove portion K is a wall surface K2 extending in the axial direction of the first pressure member 5a.

The cam surface T1 includes a plurality of inclined surfaces formed along the entire circumference of the bottom surface of the second pressure member 5b. The cam surface T1 is formed in one end surface of each of a plurality of projecting portions T that are annularly formed along the outer peripheral edge part of the second pressure member 5b. That is, the plurality of projecting portions T are formed in the second pressure member 5b so as to be arranged in the circumferential direction. One end surface of each projecting portion T is an inclined surface that constitutes the cam surface T1 of the back-torque transmitting cam. The other end surface of each projecting portion T is a wall surface T2 extending in the axial direction of the second pressure member 5b.

As illustrated in FIG. 15, when the projecting portion T is fit into the groove portion K to combine the first pressure member 5a and the second pressure member 5b with each other, the cam surface K1 and the cam surface T1 face each other to constitute the back-torque transmitting cam. Also, the wall surface K2 and the wall surface T2 face each other with a predetermined distance therebetween. Thus, while the vehicle is travelling, when a rotational force is input to the clutch member 4, via the output shaft 3, in the process where the rotational speed of the engine decreases and the weight member 8 moves from the radially-outer position to the radially-inner position and the first pressure member 5a moves to follow the interlocking member 9, the first pressure member 5a and the second pressure member 5b rotate relative to each other. Thus, due to the function of the cam surface K1 and the cam surface T1, it is possible to move the second pressure member 5b in the direction B in FIGS. 2 and 3 relative to the first pressure member 5a to keep pressing the drive-side clutch plates 6 and the driven-side clutch plates 7 against each other.

That is, when the vehicle travels along a downward slope, as the rotational speed of the engine decreases and the weight member 8 moves from the radially-outer position to the radially-inner position, the first pressure member 5a moves to follow the weight member 8 in the direction A in FIGS. 2 and 3. Then, when the rotational force of the wheel is transmitted to the clutch member 4 via the output shaft 3, the first pressure member 5a and the second pressure member 5b rotate relative to each other to generate a cam function between the cam surface K1 and the cam surface T1. The second pressure member 5b is moved in the direction B in FIGS. 2 and 3 to keep pressing the drive-side clutch plates 6 and the driven-side clutch plates 7 against each other, and thereby an engine brake can be applied.

When the activation member 10 is operated by hand or by using an actuator from the state where the engine brake is applied, the second pressure member 5b, that has been keeping pressing the drive-side clutch plates 6 and the driven-side clutch plates 7 against each other, moves in the direction A in FIGS. 2 and 3. Thus, it is possible to release the press-contact force between the drive-side clutch plates 6 and the driven-side clutch plates 7 to disengage the clutch. At this time, in the present embodiment, the movement direction where the second pressure member 5b is moved by the back-torque transmitting cam (the direction B in FIGS. 2 and 3) and the movement direction where the second pressure member 5b is moved by activation of the activation member 10 (the direction A in the figures) are opposite to each other. Therefore, when the clutch is to be disengaged, the press-contact force between the drive-side clutch plates 6 and the driven-side clutch plates 7 is released, in the state where the engine brake is applied, it is possible to avoid the operation amount of the activation member 10 from becoming excessively large.

The back-torque transmitting cam, according to the present embodiment, is formed in an outer peripheral edge part of each of the first pressure member 5a and the second pressure member 5b. The back-torque transmitting cam can move the second pressure member 5b by pressing a slide area H of the second pressure member 5b over which the drive-side clutch plates 6 and the driven-side clutch plates 7 slide (area on which a press-contact force acts) (see FIGS. 2 and 3). That is, a thrust force of the second pressure member 5b, due to the back-torque transmitting cam, is generated at the radially-outermost part of the first pressure member 5a and the second pressure member 5b and is exerted on the slide area H of the drive-side clutch plates 6 and the driven-side clutch plates 7.

If the interlocking member 9 and the weight member 8 are separated from each other when the back-torque transmitting cam is working, even when the weight member 8 subsequently moves between the radially-inner position and the radially-outer position as the clutch housing 2 rotates, it may not be possible for the interlocking member 9 to quickly follow the movement. In contrast, with the present embodiment, the first pressure member 5a follows the interlocking member 9 to be able to hold contact between the interlocking member 9 and the weight member 8 even when the back-torque transmitting cam is working, and thus the interlocking member 9 can stably follow the movement of the weight member 8.

The back-torque transmitting cam, according to the present embodiment, a cam constituted by the cam surface K1 and the cam surface T1 can start working before the back-torque limiter cam (a cam constituted by the inclined surface 4b and the inclined surface 5ab) starts working. That is, the clearance (the dimension of the gap) between the cam surface K1 and the cam surface T1 is smaller than the clearance (the dimension of the gap) between the inclined surface 4b and the inclined surface 5ab, and the back-torque transmitting cam can start working before the back-torque limiter cam starts working.

Moreover, the power transmission device according to the present embodiment includes a torque transmitting portion that is formed in each of the first pressure member 5a and the second pressure member 5b and that can transmit a rotational force, which has been transmitted to the second pressure member 5b, to the first pressure member 5a without using the back-torque transmitting cam, cam surfaces K1 and the cam surfaces T1. A movement-amount limiting portion, formed in each of the first pressure member 5a and the second pressure member 5b, limits the movement amount of the second pressure member 5b due to the back-torque transmitting cam (the cam surfaces K1 and the cam surfaces T1).

That is, as illustrated in FIGS. 6 and 8, a plurality of (in the present embodiment, three) protruding portions F are integrally formed in the first pressure member 5a so as to be arranged at regular intervals in the circumferential direction. As illustrated in FIGS. 7, 8, and 9, projecting portions G extending inward are integrally formed in the second pressure member 5b. As illustrated in FIGS. 13 and 14, when the first pressure member 5a and the second pressure member 5b are assembled together, one protruding portion F is interposed between two projecting portions G. One side surface F1 of the protruding portion F and the contact surface (first contact surface G1) of one of the projecting portions G face each other. The other side surface F2 of the protruding portion F and the contact surface (second contact surface G2) of the other projecting portion G face each other.

One side surface F1 of the protruding portion F formed in the first pressure member 5a and the first contact surface G1 of the projecting portion G formed in the second pressure member 5b constitute the torque transmitting portion, according to the present embodiment. That is, when the first pressure member 5a and the second pressure member 5b move to the active position to press the drive-side clutch plates 6 and the driven-side clutch plates 7 against each other and the clutch is engaged (driving power is transmitted) while the wall surface K2 of the groove portion K and the wall surface T2 of the projecting portion T of the back-torque transmitting cam are maintained in a separated state (see FIG. 15), as illustrated in FIG. 13, one side surface F1 of the protruding portion F and the first contact surface G1 of the projecting portion G contact each other. A rotational force of the second pressure member 5b can be received and transmitted to the first pressure member 5a.

The other side surface F2 of the protruding portion F, formed in the first pressure member 5a, and the second contact surface G2 of the other projecting portion G, formed in the second pressure member 5b, constitute the movement-amount limiting portion according to the present embodiment. That is, when a rotational force is input to the clutch member 4, via the output shaft 3, the first pressure member 5a and the second pressure member 5b rotate relative to each other. Therefore, the second pressure member 5b moves (see FIG. 16) due to the cam function of the cam surface K1 of the groove portion K and the cam surface T1 of the projecting portion T of the back-torque transmitting cam. When the movement amount reaches a set value, as illustrated in FIG. 14, the other side surface F2 of the protruding portion F and the second contact surface G2 of the projecting portion G contact each other. Thus, rotation of the second pressure member 5b relative to the first pressure member 5a is restricted. Therefore, it is possible to limit the movement amount of the second pressure member 5b when the back-torque transmitting cam is working.

In the present embodiment, the protruding portion F is formed in the first pressure member 5a, and the projecting portion G is formed in the second pressure member 5b. Alternatively, the projecting portion G may be formed in the first pressure member 5a, and the protruding portion F may be formed in the second pressure member 5b. In this case, one side surface F1 of the protruding portion F, formed in the second pressure member 5b, and the first contact surface G1 of one projecting portion G, formed in the first pressure member 5a, constitute the torque transmitting portion according to the present embodiment. The other side surface F2 of the protruding portion F, formed in the second pressure member 5b, and the second contact surface G2 of the other projecting portion G, formed in the first pressure member 5a, constitute the movement-amount limiting portion according to the present embodiment.

Furthermore, the present embodiment includes a cushioning member 13 that is interposed between the first pressure member 5a and the second pressure member 5b. The cushioning member 13, by being compressed, applies an urging force while allowing movements of the interlocking member 9 and the pressure member (5a, 5b) in the process where the interlocking member 9 moves and the first pressure member 5a and the second pressure member 5b move from the inactive position toward the active position. The cushioning member 13 includes a spring that is set to a load such that the spring is compressed before the clutch spring 11 starts to be compressed. As illustrated in FIGS. 2 and 3, the cushioning member 13 is assembled at a surface where the first pressure member 5a and the second pressure member 5b face each other, to be specific, a surface of the first pressure member 5a facing the second pressure member 5b.

To be more specific, as illustrated in FIGS. 17 and 18, the cushioning member 13 includes a C-shaped wave spring with a cutout portion 13a in a part of an annular shape. The cushioning member has a wave shape with respect to the thickness direction t. The cushioning member can generate an elastic force. The cushioning member 13 is interposed between the first pressure member 5a and the second pressure member 5b. The cushioning member, by being compressed, can apply an urging force while allowing movement of the interlocking member 9 in the process where the interlocking member 9 moves and the first pressure member 5a and the second pressure member 5b move from the inactive position to the active position.

With the cushioning member 13, when the interlocking member 9 starts moving, the pressing load (N) becomes the set load of the release spring 12 and the release spring 12 starts to be deformed (starts to be compressed). When the movement amount of the interlocking member 9 reaches a predetermined dimension, the cushioning member 13 starts to be deformed (starts to be compressed). Subsequently, when the movement amount of the interlocking member 9 reaches a predetermined dimension, the pressing load (N) reaches the set load (P2) of the clutch spring 11, and the clutch spring 11 starts to be deformed (starts to be compressed). Until the clutch spring 11 reaches the maximum load (the upper limit of the working load), the clutch spring 11 continues to be compressed (continues to be deformed) due to the movement of the interlocking member 9.

Accordingly, the cushioning member 13 is continuously compressed (deformed) to allow movement of the interlocking member 9 in the process where the pressing load increases. Therefore, it is possible to reduce the dead zone where the interlocking member 9 stops and to smoothly and continuously move the weight member 8 and the interlocking member 9. Thus, with the cushioning member 13, it is possible to suppress shock when the clutch is engaged and to suppress a feeling of surprise when power is transmitted.

Moreover, the cushioning member 13, according to the present embodiment, is disposed on the radially-inner side of the projecting portion T of the back-torque transmitting cam. That is, the outer peripheral surface of the cushioning member 13 is supported by the projecting portion T of the back-torque transmitting cam. When a centrifugal force is generated in the cushioning member 13, as the first pressure member 5a and the second pressure member 5b rotate, the projecting portion T prevents the diameter of the cushioning member 13 from increasing.

With the present embodiment, the pressure member (5a, 5b) includes the first pressure member 5a, second pressure member 5b and back-torque transmitting cam. The first pressure member 5a moves in a direction such that the first pressure member 5a presses the drive-side clutch plates 6 and the driven-side clutch plates 7 against each other by receiving a pressing force of the interlocking member 9. The second pressure member 5b moves in a direction such that the second pressure member 5b releases a press-contact force between the drive-side clutch plates 6 and the driven-side clutch plates 7 by receiving an activation force of the activation member 10. The back-torque transmitting cam (K1, T1) moves the second pressure member 5b relative to the first pressure member 5a to keep pressing the drive-side clutch plates 6 and the driven-side clutch plates 7 against each other when a rotational force is input to the clutch member 4, via the output shaft 3, in a process where the weight member 8 moves from the radially-outer position to the radially-inner position and the first pressure member 5a moves to follow the interlocking member 9. Therefore, it is possible to allow a clutch operation to be smoothly performed in a state where an engine brake is applied.

The movement direction where the second pressure member 5b is moved by the back-torque transmitting cam (K1, T1) and the movement direction where the second pressure member 5b is moved by activation of the activation member 10 are opposite to each other. Therefore, it is possible to make the activation amount by the activation member 10 smaller when a clutch operation is performed by using the activation member 10 in a state where an engine brake is applied. Moreover, the back-torque transmitting cam (K1, T1) is formed in an outer peripheral edge part of each of the first pressure member 5a and the second pressure member 5b. Therefore, it is possible to generate a larger cam thrust force and to more reliably press the drive-side clutch plates 6 and the driven-side clutch plates 7 against each other when an engine brake is to be applied.

Furthermore, the back-torque transmitting cam (K1, T1) can move the second pressure member 5b by pressing the slide area H of the second pressure member 5b over which the drive-side clutch plates 6 and the driven-side clutch plates 7 slide. Therefore, it is possible to efficiently convert a thrust force generated by the cam into a press-contact force between the drive-side clutch plates 6 and the driven-side clutch plates 7 and to more reliably press the drive-side clutch plates 6 and the driven-side clutch plates 7 against each other when an engine brake is to be applied.

The power transmission device includes, in addition to the release spring 12 and the clutch spring 11, the cushioning member 13 interposed between the first pressure member 5a and the second pressure member 5b. The cushioning member 13, by being compressed, can apply an urging force while allowing movement of the interlocking member 9 in a process where the interlocking member 9 moves and the pressure member (5a, 5b) moves from the inactive position toward the active position. Therefore, it is possible to suppress a feeling of surprise when power is transmitted and to improve operability.

Moreover, the cushioning member 13, according to the present embodiment, is a wave spring including a C-shaped member with the cutout portion 13a in a part of an annular shape. The back-torque transmitting cam (K1, T1) supports the outer peripheral surface of the wave spring. Therefore, it is possible for the back-torque transmitting cam (K1, T1) to have both a function of allowing the second pressure member 5b to keep pressing the drive-side clutch plates 6 and the driven-side clutch plates 7 against each other and a function preventing the wave spring from expanding in the radially-outward direction by receiving a centrifugal force while supporting the wave spring.

Furthermore, the power transmission device includes the torque transmitting portion (one side surface F1 of the protruding portion F and the first contact surface G1 of the projecting portion G) formed in each of the first pressure member 5a and the second pressure member 5b. The torque transmitting portion can transmit a rotational force, which has been transmitted to the second pressure member 5b, to the first pressure member 5a without using the back-torque transmitting cam (K1, T1). Therefore, it is possible to allow power transmission to be stably performed.

With the embodiment described above, the back-torque transmitting cam moves the second pressure member 5b in a direction toward the interlocking member 9 to hold contact between the interlocking member 9 and the weight member 8. Therefore, it is possible to press the drive-side clutch plates 6 and the driven-side clutch plates 7 against each other to transmit a rotational force on the wheel side to the engine side to apply an engine brake. Also, it is possible to stably perform activation by the weight member 8 when an engine brake is applied.

The back-torque transmitting cam, according to the present embodiment, includes the cam surfaces (K1, T1), respectively, integrally formed in the first pressure member 5a and the second pressure member 5b. The cam surfaces (K1, T1) are respectively formed in the mating surfaces of the first pressure member 5a and the second pressure member 5b. Therefore, it is possible to enable the back-torque transmitting cam to reliably and smoothly move the second pressure member 5b.

Moreover, the power transmission device includes a press-contact assisting cam including the inclined surface 4a of the clutch member 4 and the inclined surface 5aa of the first pressure member 5a facing each other. The pressure-contact assisting cam increases the press-contact force between the drive-side clutch plates 6 and the driven-side clutch plates 7 when a rotational force input to the input gear 1 (input member) becomes capable of being transmitted to the output shaft 3 (output member). Therefore, it is possible to apply a press-contact force, due to the press-contact assisting cam, in addition to a press-contact force due to the movement of the weight member 8 by a centrifugal force. Thus, it is possible to press the drive-side clutch plates 6 and the driven-side clutch plates 7 against each other more smoothly and more reliably.

Furthermore, the power transmission device includes a back-torque limiter cam including the inclined surface 4b of the clutch member 4 and the inclined surface 5ab of the first pressure member 5a facing each other. The back-torque limiter cam releases the press-contact force between the drive-side clutch plates 6 and the driven-side clutch plates 7 when the rotational speed of the output shaft 3 (output member) exceeds the rotational speed of the input gear 1 (input member) and the clutch member 4 and the pressure member (5a, 5b) rotate relative to each other. Therefore, it is possible to avoid excessive driving power from being transmitted to the engine side via the input gear 1 when the weight member 8 is at the radially-outer position. Also, it is possible to reliably activate the back-torque transmitting cam because the back-torque transmitting cam is activated before the back-torque limiter cam starts working.

In addition, the present embodiment includes: a back-torque transmitting cam and a torque transmitting portion. The back-torque transmitting cam moves the second pressure member 5b to press the drive-side clutch plates 6 and the driven-side clutch plates 7 against each other when a rotational force is input to the clutch member 4, via the output shaft 3 (output member). The torque transmitting portion, formed in each of the first pressure member 5a and the second pressure member 5b, transmits a rotational force that has been transmitted to the second pressure member 5b, to the first pressure member 5a without using the back-torque transmitting cam (the cam surface K1 and the cam surface T1). Therefore, it is possible to apply an engine brake by pressing the drive-side clutch plates 6 and the driven-side clutch plates 7 against each other to transmit a rotational force on the wheel side to the engine side. Also, it is possible to stably perform power transmission when the weight member 8 moves to the radially-outer position and the pressure member (5a, 5b) moves to the active position.

Further, the power transmission device includes the movement-amount limiting portion, formed in each of the first pressure member 5a and the second pressure member 5b, that limits the movement amount of the second pressure member 5b due to the back-torque transmitting cam. Therefore, it is possible to enable the back-torque transmitting cam to move the second pressure member 5b in a set range.

Moreover, the protruding portion F is formed in either one of the first pressure member 5a and the second pressure member 5b. The torque transmitting portion includes one side surface F1 of protruding portion F and the first contact surface G1 that receive a rotational force by contacting the one side surface F1. The movement-amount limiting portion includes the other side surface F2 of the protruding portion F and the second contact surface G2 can limit the movement amount by contacting the other side surface F2. Therefore, the protruding portion F can function as both the torque transmitting portion and the movement-amount limiting portion.

Heretofore, the present embodiment has been described. However, the present invention is not limited to these. For example, as illustrated in FIGS. 19 and 20, a coned-disc spring 14, disposed between the first pressure member 5a and the second pressure member 5b, may be used as a cushioning member. As illustrated in FIGS. 21 and 22, no cushioning member may be provided between the first pressure member 5a and the second pressure member 5b. Note that the power transmission device according to the present invention can be applied to various multiple-disc clutch power transmission devices for, in addition to a motorcycle, an automobile, a three-wheeled or four-wheeled ATV, a general-purpose machine, and the like.

Moreover, as illustrated in FIG. 23, a cup-shaped bearing holding member C may be provided. An activation member 10 engages with an opening formed in a top portion of the bearing holding member C via a roller bearing B1. A pressure member (5a, 5b) is movable between an active position and an inactive position in the left-right direction in the figure by being operated by an operator or by working of an actuator. In this case, the release spring 12 is a coned-disc spring disposed between the second pressure member 5b and the bearing holding member C. In the figure, the symbol r represents an oil flow path r.

The pressure member can be applied to a power transmission device having a different outer shape or having another additional function, as long as the pressure member includes a first pressure member, a second pressure member and a back-torque transmitting cam. The first pressure member moves in a direction such that the first pressure member presses the drive-side clutch plates and the driven-side clutch plates against each other by receiving a pressing force of the interlocking member. The second pressure member moves in a direction such that the second pressure member releases a press-contact force between the drive-side clutch plates and the driven-side clutch plates by receiving an activation force of the activation member. The back-torque transmitting cam moves the second pressure member relative to the first pressure member to keep pressing the drive-side clutch plates and the driven-side clutch plates against each other when a rotational force is input to the clutch member, via the output member, in a process where the weight member moves from the radially-outer position to the radially-inner position and the first pressure member moves to follow the interlocking member.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A power transmission device comprising:
   a clutch member housed in a clutch housing that rotates together with an input member rotated by engine driving power of a vehicle and the clutch housing including a plurality of drive-side clutch plates, the clutch member including a plurality of driven-side clutch plates alternately positioned with the drive-side clutch plates of the clutch housing and coupled to an output member rotating a wheel of the vehicle;
   a pressure member movable between an active position and an inactive position, in the active position, the pressure member presses the drive-side clutch plates and the driven-side clutch plates against each other to be able to transmit the engine driving power to the wheel and in the inactive position the pressure member releases a press-contact force between the drive-side clutch plates and the driven-side clutch plates to be able to stop transmitting the engine driving power to the wheel;
   a weight member movable from a radially-inner position to a radially-outer position due to a centrifugal force generated by the rotating clutch housing;
   an interlocking member moving the pressure member from the inactive position to the active position as the weight member moves from the radially-inner position to the radially-outer position;
   an activation member moving the pressure member in a direction such that a press-contact force between the drive-side clutch plates and the driven-side clutch plates is enabled to be released;
   the pressure member further comprising:
      a first pressure member moving in a direction such that the first pressure member presses the drive-side clutch plates and the driven-side clutch plates against each other by receiving a pressing force of the interlocking member,
      a second pressure member moving in a direction such that the second pressure member releases a press-contact force between the drive-side clutch plates and the driven-side clutch plates by receiving an activation force of the activation member,
      a back-torque transmitting cam configured to move the second pressure member relative to the first pressure member in a direction such that the drive-side clutch plates and the driven-side clutch plates are pressed against each other to keep pressing the drive-side clutch plates and the driven-side clutch plates against each other when a rotational force is input to the clutch member via the output member and the first pressure member follows the interlocking member and moves in a released direction, and the back-torque transmitting cam includes cam surfaces in mating surfaces of the first pressure member and the second pressure member, and due to the function of the cam surfaces, it is possible to move the second pressure member in the direction to press the clutch plates when the back torque is generated from the output.

2. The power transmission device according to claim 1, wherein a movement direction where the second pressure member is moved by the back-torque transmitting cam and a movement direction where the second pressure member is moved by activation of the activation member are opposite to each other.

3. The power transmission device according to claim 2, wherein the back torque transmitting cam is formed in an outer peripheral edge part of each of the first pressure member and the second pressure member.

4. The power transmission device according to claim 1, wherein the back torque transmitting cam is formed in an outer peripheral edge part of each of the first pressure member and the second pressure member.

5. The power transmission device according to claim 4, wherein the drive-side clutch plate is substantially annular, and a radially-outer end of the back torque transmitting cam is located radially outside a radially-inner end of the drive-side clutch plate.

6. The power transmission device according to claim 4, wherein the drive-side clutch plate is formed in a substantially annular shape, and a radially-outer end of the back-torque transmitting cam is located radially outside a radially-inner end of the drive-side clutch plate.

7. The power transmission device according to claim 1, wherein the back torque transmitting cam moves the second pressure member by pressing a slide area of the second pressure member over which the drive-side clutch plates and the driven-side clutch plates slide.

8. The power transmission device according to claim 1, further comprising:
- a release spring holding the pressure member at the inactive position, the release spring is compressed as the interlocking member moves and the pressure member moves from the inactive position toward the active position, and the release spring applying an urging force while enabling movements of the interlocking member and the pressure member until the drive-side clutch plates and the driven-side clutch plates reach an engaged state before the drive-side clutch plates and the driven-side clutch plates are pressed against each other;
- a clutch spring is configured to be compressed in a process where the interlocking member moves after the drive-side clutch plates and driven-side clutch plates have reached the engaged state and the clutch spring applies a press-contact force between the drive-side clutch plates and the driven-side clutch plates enabling movement of the interlocking member; and
- a cushioning member interposed between the first pressure member and the second pressure member, the cushioning member configured to, by being compressed, apply an urging force while enabling movement of the interlocking member in a process where the interlocking member moves and the pressure member moves from the inactive position toward the active position.

9. The power transmission device according to claim 8, wherein the cushioning member is a wave spring including a C-shaped member with a cutout portion in a part of an annular shape, and the back-torque transmitting cam supports an outer peripheral surface of the wave spring.

10. The power transmission device according to claim 1, further comprising a torque transmitting portion, formed in each of the first pressure member and the second pressure member, transmitting a rotational force, that has been transmitted to the second pressure member, to the first pressure member without using the back-torque transmitting cam.

11. A power transmission device comprising:
- a clutch member housed in a clutch housing that rotates together with an input member rotated by engine driving power of a vehicle and the clutch housing including a plurality of drive-side clutch plates, the clutch member including a plurality of driven-side clutch plates alternately positioned with the drive-side clutch plates of the clutch housing and coupled to an output member rotating a wheel of the vehicle;
- a pressure member movable between an active position and an inactive position, in the active position, the pressure member presses the drive-side clutch plates and the driven-side clutch plates against each other to be able to transmit the engine driving power to the wheel and in the inactive position the pressure member releases a press-contact force between the drive-side clutch plates and the driven-side clutch plates to be able to stop transmitting the engine driving power to the wheel;
- a weight member movable from a radially-inner position to a radially-outer position due to a centrifugal force generated by the rotating clutch housing;
- an interlocking member moving the pressure member from the inactive position to the active position as the weight member moves from the radially-inner position to the radially-outer position;
- an activation member moving the pressure member in a direction such that a press-contact force between the drive-side clutch plates and the driven-side clutch plates is enabled to be released;
- the pressure member further comprising:
- a first pressure member moving in a direction such that the first pressure member presses the drive-side clutch plates and the driven-side clutch plates against each other by receiving a pressing force of the interlocking member,
- a second pressure member moving in a direction such that the second pressure member releases a press-contact force between the drive-side clutch plates and the driven-side clutch plates by receiving an activation force of the activation member,
- a back-torque transmitting cam configured to move the second pressure member relative to the first pressure member to keep pressing the drive-side clutch plates and the driven-side clutch plates against each other when a rotational force is input to the clutch member via the output member and the first pressure member moves in a released direction, and the back-torque transmitting cam includes cam surfaces in mating surfaces of the first pressure member and the second pressure member, and due to the function of the cam surfaces, it is possible to move the second pressure member in the direction to press the clutch plates when the back torque is generated from the output; and
- a movement direction where the second pressure member is moved by the back-torque transmitting cam and a movement direction where the second pressure member is moved by activation of the activation member are opposite to each other.

* * * * *